(12) United States Patent
Perl et al.

(10) Patent No.: US 10,878,510 B2
(45) Date of Patent: Dec. 29, 2020

(54) TELEMATICS SYSTEM AND CORRESPONDING METHOD THEREOF

(71) Applicant: Swiss Reinsurance Company Ltd., Zurich (CH)

(72) Inventors: Andri Perl, Oberhasli (CH); Sebastiaan Bongers, Au (CH); Andrea Keller, Zurich (CH)

(73) Assignee: Swiss Reinsurance Company Ltd., Zurich (CH)

( * ) Notice: Subject to any disclaimer, the term of this patent is extended or adjusted under 35 U.S.C. 154(b) by 182 days.

(21) Appl. No.: 15/943,202

(22) Filed: Apr. 2, 2018

(65) Prior Publication Data

US 2018/0300816 A1 Oct. 18, 2018

Related U.S. Application Data

(63) Continuation of application No. PCT/EP2016/055869, filed on Mar. 17, 2016.

(51) Int. Cl.
| | |
|---|---|
| *G06Q 40/08* | (2012.01) |
| *B60W 40/00* | (2006.01) |
| *G06Q 50/00* | (2012.01) |
| *G07C 5/00* | (2006.01) |

(52) U.S. Cl.
CPC ............ *G06Q 40/08* (2013.01); *B60W 40/00* (2013.01); *G06Q 50/01* (2013.01); *G07C 5/008* (2013.01)

(58) Field of Classification Search
CPC ..................................................... G06Q 40/08
USPC ............................................................ 705/4
See application file for complete search history.

(56) References Cited

U.S. PATENT DOCUMENTS

| 9,086,948 | B1 | 7/2015 | Slusar et al. | |
|---|---|---|---|---|
| 10,475,127 | B1 * | 11/2019 | Potter | G08B 25/00 |
| 2011/0112870 | A1 * | 5/2011 | Berg | G06Q 40/08 |
| | | | | 705/4 |

OTHER PUBLICATIONS

"Emergency Event Based Vehicle Data Logging." Telecommunications Weekly [Atlanta] Jul. 30, 2014. Published Online. (Year: 2014).*
International Search Report dated Jun. 28, 2016 in International Application No. PCT/EP2016/055869.
(Continued)

*Primary Examiner* — Sara C Hamilton
(74) *Attorney, Agent, or Firm* — Oblon, McClelland, Maier & Neustadt, L.L.P.

(57) ABSTRACT

A telematics system and method thereof with mobile telematics devices associated with a plurality of motor vehicles. The telematics devices include one or more wireless connections or wired connections, and a plurality of interfaces to connect with at least one of a data transmission bus of a motor vehicle, and/or a plurality of interfaces to connect with sensors and/or measuring devices and/or speakers and/or microphones. To provide a wireless connection, at least one of the mobile telematics devices acts as a wireless node within a corresponding data transmission network by way of antenna connections of the mobile telematics device. At least one of the mobile telematics devices is connected to an on-board diagnostic system (OBD) and/or an in-car interactive device and/or a monitoring cellular mobile node application, and wherein at least one of the mobile telematics devices capture usage-based and/or user-based telematics data of a motor vehicle and/or user.

35 Claims, 4 Drawing Sheets

(56) References Cited

OTHER PUBLICATIONS

Jamie Carter; Telematics: what you need to know, How digital telematics tech will make you drive more carefully, Future Publishing Limited Quay House, The Ambury, Bath BA1 1UA, Jun. 27, 2012.
Lucas Mearian, Insurers will now be able to track driver behavior via smartphones, Computerworld, Sep. 3, 2014.
On-board diagnostics from Wikipedia, pp. 1-16, Jun. 15, 2016.
Machine learning from Wikipedia, pp. 1-13, Jun. 16, 2016.

\* cited by examiner

TELEMATICS SYSTEM AND CORRESPONDING METHOD THEREOF

CROSS REFERENCE TO RELATED APPLICATION

This application is a continuation of PCT International Application No. PCT/EP2016/055869, filed on Mar. 17, 2016, the entire contents of which are incorporated herein by reference.

FIELD OF THE INVENTION

The present invention relates to telematics based automated risk-transfer, alert and real-time notification systems for motor vehicles and wireless technology used in the context of telematics. Especially, the invention relates to machine-learning based telematics systems. The term telematics, in particular traffic telematics, refers to systems that are used for communications, instrumentation and control, and information technology in the field of transportation. More particular, the present invention relates to the use of telematics together with real-time risk-monitoring, automated risk-transfer and insurance systems based on captured and measured usage-based and/or user-based telematics data, in particular to systems enabled to trigger, signal, and mutually activate coupled first and second insurance system (risk-transfer tiers) providing a self-sufficient, automated risk protection for a variable number of risk exposed motor vehicles.

BACKGROUND OF THE INVENTION

In electronic, telecommunication and insurance industry, companies are adopting similar and consistent technical strategies to improve the effectiveness of interactions with customers, which today increasingly is a pure technology component. Social networking, telematics, service-oriented architectures (SOA) and usage-based services (UBS) are all in interacting and pushing this development. Social platforms, as e.g. Facebook, Twitter and YouTube, offer the ability to improve customer interactions and communicate product information. However, the field of telematics is larger still, as it introduces entirely new possibilities that align the technical input requirements and problem specifications of dynamic risk-transfer, technology and mobility. SOA and telematics is becoming key to managing the complexity of integrating known technologies and new applications.

Telematics, a composite term of telecommunication and information technology, is an interdisciplinary technical term encompassing telecommunications, vehicular technologies, road transportation, road safety, electrical engineering (sensors, instrumentation, wireless communications, etc.), and information technology (multimedia. Internet, etc.). Thus, the technical field of telematics are affected by a wide range of technologies as the technology of sending, receiving and storing information via telecommunication devices in conjunction with affecting control on remote objects, the integrated use of telecommunications and informatics for application in vehicles and e.g. with control of vehicles on the move, GNSS (Global Navigation Satellite System) technology integrated with computers and mobile communications technology in automotive navigation systems. The use of such technology together with road vehicles is also called vehicle telematics. In particular, telematics triggers the integration of mobile communications, vehicle monitoring systems and location technology by allowing a new way of capturing and monitoring real-time data. Usage-based risk-transfer systems, as e.g. provided by the so called Snapshot technology of the firm Progressive, links risk-transfer compensation or premiums to monitored driving behavior and usage information gathered by an in-car "telematics" device. In the past five years, telematics devices show expanded use by a factor 10 to 100 in cars. On such a broadened platform, telematics devices and systems may help to increase safety and improve driving behavior.

Telematics refers to installing or embedding telecommunications devices mostly in mobile units, as e.g. cars or other vehicles, to transmit real-time driving data, which for example can be used by third parties' system, as automated risk-monitoring and risk-transfer systems, providing the needed input e.g. to measure the quality and risks of individual drivers. The telematics instruments for such changes are available in the market. Vehicle tracking and global positioning satellite system (GPS) technologies are becoming commonplace, as are the telecommunications devices that allow us to be connected from almost anywhere. In particular, dynamically monitored and adapted risk-transfer could be imaginable by interconnecting telematics with other real-time measuring systems. Advantages provided by such systems could e.g. comprise, that drivers could receive quotes for and buy auto insurance in real time by tapping on an in-vehicle navigation screen. After getting involved into a car accident, emergency and road services could be automatically activated, vehicle damage assessed, and the nearest repair shop contacted. In summary, the customer experience could be transformed beyond traditional operatability of risk-transfer systems and insurance coverage to real-time navigation and monitoring, including the automated activation of concierge service, safe driving tips, video-on-demand for the kids in the backseat, in-car or online feedback, and real-time vehicle diagnostics.

In addition to real-time surveillance, it is to be mentioned, that an insurance agent may want to exchange information with a customer associated with insurer for a number of different reasons. However, the information exchange between the customer and the insurer and/or the insurer and the reinsurer mostly is still cumbersome and time-consuming, and thus, risk-transfers provided by such structures typically remain static within a fixed time period agreed upon. For example, an existing or potential consumer may access an insurance agent's web page to determine a yearly or monthly cost of an insurance policy (e.g. hoping to save money or increase a level of protection by selecting a new insurance company). The consumer may provide basic information to the insurance agent (e.g. name, a type of business, date of birth, occupation, etc.), and the insurance agent may use this information to request a premium quote from the insurer. In some cases, the insurer will simply respond to the insurance agent with a premium quote. In other cases, however, an underwriter associated with insurer will ask the insurance agent to provide additional information so that an appropriate premium quote can be generated. For example, an underwriter might ask the insurance agent to indicate how often, where and to which time a motor vehicle is mainly used or other data as age of the motor vehicle and indented use (transportation etc.). Only after such additional information is determined, an appropriate risk analysis can be performed by the insurer to process adapted underwriting decision, and/or premium pricing.

Integrated telematics may offer new technological fields, in particular in monitoring and steering by means of centralized expert systems, as e.g. in the risk-transfer technology far more accurate and profitable pricing models provided by such automated expert systems. This would create a huge advantage, in particular for real-time and/or usage-based and/or dynamically operated systems. The advantage of such telematics systems is not restricted to risk transfer rather as also advantages e.g. in fleets' management that monitor employees' driving behavior via telematics improving asset utilization, reduce fuel consumption and improve safety etc. etc. Other fields may also benefit form such integrated telematics systems, as state and local governments needs striving to improve fuel consumption, emissions and highway safety. Some states, for example, recently issued dynamic pay-as-you-drive (PAYD) regulations, which on the other side allows insurers to offer drivers insurance rates based on actual versus estimated miles driven. It's a financial incentive to drive less.

Already now, the telematics technology provides features as an accelerometer allowing to assess drivers' style and behavior, thus expanding the risk factors normally tracked from the current 40 to more than 100. As demand for accelerometers has increased, auto-makers and device manufacturers have been able to push down the unit cost. The need for increased connectivity and access (driven by the "always-connected" consumer) will allow additional device applications. It is to be pointed out that most technologies in the telematics ecosystem are not unique to vehicle's insurance. Social listening, neighborhood protection portals and home monitoring have an impact on how home and property insurance risks are assessed. Further, monitoring systems are available to adjust home temperature controls or automatically dispatch service providers should there be a water, heat or air-conditioning issue in a home. Also, telematics technologies are being developed for healthcare and senior living products, including location-based alerts, health-monitoring, and family-tracking services that may be used for how individual risk is assessed, allowing optimized risk-transfer in the life risk-transfer field. Examples are also robotic nurse's aid designed to remind the elderly about routine activities, also guides them through their homes and calls for help in case of emergencies. These sorts of applications will continue to evolve as technology becomes more reliable and cost effective and as the need for such solutions increases in the elderly and home-care sectors.

Telematics technology, as used in the way of the present invention, may also provide the basis technology for Service-oriented architectures (SOAs) or usage-based and/or user-based applications. Both are considered among the most promising of today's technologies. SOAs allow companies to make their applications and computing resources (such as customer databases and supplier catalogs) available on an as-needed basis, either via an intranet or the Internet. Based on a plug-and-play concept, SOA provides reusable software components across multiple technology platforms. It offers a new approach to software deployment while also tackling serious problems, such as complexity and ineffective data integration. This approach provides a consistent technology making it easier to access data and to integrate both new and old content. Information and services are centralized and reusable, shortening development times and reducing maintenance costs. When a software service is needed (such as retrieving customer information) the user or system sends a request to a directory, which determines the proper service name, location and required format, and then sends back the desired output (in this case, customer information). Users and other applications do not need to know the internal workings of the data handling or processing. Nor do organizations need to own and maintain software; they just access the appropriate service over the Internet or network, or another data transmission network.

SUMMARY OF THE INVENTION

It is one object of the present invention to provide a dynamically triggered, automated, and telematics system and method, in particular a machine-learning based telematics system, based on real-time capturing of telematics data by means of distributed mobile telematics devices on motor vehicles. The automated system should be able to capture and monitor the risk associated risk events of a variable number of risk exposed motor vehicles by providing dynamic, self-sufficient risk protection for the motor vehicles; In particular, it is an object of the present invention to extend the existing technology to a dynamic triggered and adjusted, multi-tier risk-transfer system based on a dynamic adaptable loss-ratio structure at the first-tier level (insurance), and/or a dynamically floating second-tier recoverable (reinsurance), thereby reinforcing the importance of developing automated systems allowing self-sufficient, real-time reacting operation; more particularly, it is an object to provide an automated trigger mechanism and appropriate device between the two coupled risk-transfer systems offering a measurable optimization of the systems. Another object of the invention seeks to provide a way to technically capture, handle and automate dynamically adaptable, complex risk transfer structures and trigger operations that are related to automate optimally shared risks and transfer operations. Another object of the invention seeks to dynamically synchronize and adjust such operations to changing environmental or operational conditions by means of telematics data invasive, harmonized use of telematics between the different tiers based on an appropriate technical multi-layered trigger structure approach. In contrast to standard practice, the resource pooling systems of the different risk-transfer tiers shall create a reproducible and optimized operation with the desired, technically based, repetitious accuracy that relies on technical means, process flow and process control/operation. Finally, one of the objects of the present invention addresses the technical problem of coupling two automated risk-transfer systems with the goal of pooling the risk exposure of associated components and seeking better and more effective technical implementations, thereby enabling to share and minimize the needed telematics resources and to provide a unified, optimized multi-tier risk-transfer approach by sharing expert and development means for generating minimized conditions for the necessarily required resource-pooling (e.g. pooled premiums). Along the automated insurance telematics value chain, there are many technologies offering individual elements, however, it is an object of the present invention to provide a holistic technical solution that covers the whole range from device installation to the automated and accurate risk measuring, analysis and management. Finally, it is a further object of the invention to provide a dynamic, machine learning-based scoring system based on real-time scoring and measurements, and further to provide a technically scalable solution based on scoring algorithms and data processing allowing to adapt the signaling to other field of automated risk-transfer.

According to the present invention, these objects are achieved, particularly, with the features of the independent claims. In addition, further advantageous embodiments can be derived from the dependent claims and the related descriptions.

According to the present invention, the above-mentioned objects for a dynamic triggered, multi-tier risk-transfer system based on an automatically steered, telematics system with mobile telematics devices associated with a plurality of motor vehicles, in particular a machine-learning based and/or expert-system based telematics system, are achieved, particularly, in that, by means of the present invention, the telematics devices comprise one or more wireless connections, and a plurality of interfaces for connection with at least one of a vehicle's data transmission bus, and/or a plurality of interfaces for connection with sensors and/or measuring devices and/or speakers and/or microphones, wherein, for providing the wireless connection, the telematics device acts as wireless node within a corresponding data transmission network by means of antenna connections of the telematics device and wherein the telematics devices are connected to an on-board diagnostic system and/or an in-car interactive device and/or a monitoring cellular mobile node application, and wherein the telematics devices capture usage-based and/or user-based telematics data of the motor vehicle and/or user, in that the plurality of mobile telematics devices associated with the motor vehicles are connected to a machine-learning based telematics circuit, wherein an uni- or bidirectional data link is set by means of the wireless connection between the machine-learning based telematics circuit transmitting at least the captured usage-based and/or user-based telematics data form the mobile telematics devices to the machine-learning based telematics circuit, in that the machine-learning based telematics system comprises one or more first risk-transfer systems to provide a first risk-transfer based on first risk transfer parameters from at least some of the motor vehicles to the first risk-transfer system, wherein the first risk-transfer system comprises a plurality of payment transfer modules configured to receive and store first payment parameters associated with risk-transfer of risk exposures of said motor vehicles for pooling of their risks, in that by means of the machine-learning based circuit of the telematics system risk-related telematics data captured from the mobile telematics devices are processed, wherein first risk transfer parameters and correlated first payment transfer parameters are generated by means of the machine-learning based telematics circuit and transmitted to the first risk-transfer system, and wherein, in the case of triggering the occurrence of one of defined risk events associated with transferred risk exposure of the motor vehicles, the occurred loss is automatically covered by the first risk-transfer system based on the first risk transfer parameters and correlated first payment transfer parameters, in that the machine-learning based telematics system comprises a second risk-transfer system to provide a second risk-transfer based on second risk-transfer parameters from one or more of the first risk-transfer systems to the second risk-transfer system, wherein the second risk-transfer system comprises second payment transfer modules configured to receive and store second payment parameters for pooling of the risks of the first risk-transfer systems associated with risk exposures transferred to the first risk-transfer systems, in that second risk transfer parameters and correlated second payment transfer parameters are generated by means of the machine-learning based telematics circuit and transmitted to the second risk-transfer system, wherein, in the case of triggering the exceedance of a defined activation threshold parameter associated with the occurrence of the defined risk events or as a predefined defined portion of an occurred loss, the occurred loss is at least partly covered by the second insurance system based on the second risk transfer parameters and correlated second payment transfer parameters, and in that the first and second risk transfer parameters and the correlated first and second payment transfer parameters are dynamically optimized by means of the machine-learning based telematics circuit based on the captured usage-based and/or user-based telematics data from the mobile telematics devices associated with the plurality of motor vehicles and based on the pooled risks of the first risk transfer systems. The telematics devices can e.g. provide the one or more wireless connections by means radio data systems (RDS) modules and/or positioning system including a satellite receiving module and/or a mobile telephone including a digital radio service module and/or a language unit in communication the radio data system or the positioning system or the cellular telephone module. The satellite receiving module can e.g. comprise a Global Positioning System (GPS) circuit and/or the digital radio service module comprises at least a Global System for Mobile Communications (GSM) unit, the plurality of interfaces for connection with at least one of a motor vehicle's data transmission bus can e.g. comprise at least on interface for connection with a motor vehicle's Controller Area Network (CAN) bus, e.g. in connection with on-board diagnostics (OBD) port, or other connection e.g. for battery installed devices. The machine-learning based telematics circuit can further comprise an aggregation module providing the risk exposure for one or a plurality of the pooled risk exposed motor vehicles based on the captured risk-related telematics data, wherein the first and second risk transfer parameters and the correlated first and second payment transfer parameters are dynamically generated based on the likelihood of the occurrence of the predefined risk events of the pooled motor vehicles. In addition, the occurred and triggered losses can be automatically aggregated by means of captured loss parameters of the measured occurrence of risk events over all risk exposed motor vehicles within a predefined time period by incrementing an associated stored aggregated loss parameter and for automatically aggregating the received and stored first payment parameters over all risk exposed vehicles within the predefined time period by incrementing an associated stored, aggregated payment parameter, and wherein the variable first and second risk transfer parameters and the correlated first and second payment transfer parameters dynamically are generated based upon the ratio of the aggregated loss parameter and the aggregated payment parameter. The first and second risk-transfer system can e.g. be fully automated steered, triggered, signaled, and mutually activated by means of the machine-learning based telematics system based on the dynamic-adaptable first and second risk transfer parameters and the correlated first and second payment transfer parameters by means of the machine-learning based circuit, providing a self-sufficient risk protection for the variable number of motor vehicles associated with the mobile telematics devices by means of the coupled first and second insurance system. In the context of the first- and second risk-transfer tier, the first risk-transfer system can e.g. comprise an automated first resource pooling system and the second risk-transfer system comprises a automated second resource pooling system, wherein the risk exposed motor vehicles are connected to the first resource pooling system by means of a plurality of payment transfer modules configured to receive and store first payments from the risk exposed motor vehicles for the pooling of their risk exposures, wherein the first risk-transfer system provides automated risk protection for each of the connected risk exposed motor vehicles based on received and stored first payment parameters, wherein the first risk-transfer system is connected to the second resource pooling system by means of second payment transfer modules configured to receive and store second payment parameters from the first insurance system for adopting of a portion of the risk exposures accumulated by the first risk-transfer system, and wherein, in the case of the occurrence of one of defined risk events the occurred loss is automatically covered by the machine-learning based telematics system. One of the advantages of the present system is to provide a technical solution of coupling two automated risk-transfer systems with a better and more effective technical implementations, thereby enabling to share and minimize the needed telematics resources and to provide a unified, optimized multi-tier risk-transfer approach by sharing expert and development means for generating minimized conditions for the necessarily required resource-pooling (e.g. pooled premiums). Further, the present invention provides a holistic technical solution that covers the whole range from telematics device and/or app installation to the automated and accurate risk measuring, analysis and management. Finally, it provides a dynamic, machine learning-based scoring system based on real-time scoring and measurements, and further provides a technically scalable solution based on scoring algorithms and data processing allowing to adapt the signaling to other field of automated risk-transfer. The present invention with the machine-leaning based system, which is enhanced by contextual data, is able to provide best and highest optimized technical solution to the real-time adapted multi-tier risk-transfer system. It allows to capture and control the scores driver behavior, and compare its behavior within the technical operation and context. It allows to automatically capture scores risks according to location or trip, and to automatically analyze and react on data related to the need of value added services, as e.g. accident notifications and/or feedback to the driver and/or automated fleet risk reporting and/or automated and dynamically optimized underwriting etc.). The telematics based feedback means of the system may e.g. comprise a dynamic alert feed via a data link to the motor vehicle's mobile telematics device, wherein the machine-learning based telematics circuit heads up device alerts drivers immediately to a number of performance measures including e.g. high RPM, i.e. high revolutions per minute as a measure of the frequency of the motor rotation of the motor vehicle's engine, unsteady drive, unnecessary engine power, harsh acceleration, road anticipation, and/or ECO drive. Clearly, even the most experienced drivers can benefit from having their driving behavior dynamically analyzed and improved. The vehicle telematics system 1 provides the opportunities for improvement dynamically and in real-time, i.e. as and when they happen, related to the driver's risk behavior. Providing instant feedback to drivers through heads up training aids and get information sent straight to the mobile telematics device, ensures a two pronged approach to correcting risky (and often expensive) driving habits. Thus, the telematics system 1 not only allows to mutually optimize the operational parameters of the first and second risk transfer system, but also optimize the risk and/or risk behavior on the level of the risk exposed motor vehicles. No prior art system allows such an integral, real-time optimization. As another value added service, the telematics system 1 can e.g. dynamically generated fleet risk reports of selected motor vehicles. Such fleet reports automated generated by the telematics system 1 provide a new approach to share and compare driver statistics. Additional advantages follow as a direct effect of such reports, as automated reward generation of top performers or identification of drivers who need extra training, etc. The proposed invention with e.g. prefunding telematics enabled (re)insurance means will stimulate the carriers (first-tier risk-transfer systems) to provide its telematics and claims history to the second-tier risk-transfer system in order to continually improve its scoring service, which in turn benefits carrier in helping reduce costs and combined ratio.

In one alternative embodiment, the machine-leaning based circuit comprises a scores driver module triggering and automatically selecting scores driver parameters based on defined scores driver behavior pattern by comparing captured telematics data with the defined scores driver behavior pattern. The scores driver module can further e.g. automatically capture scores risks according to the measured location or trip of the motor vehicle based on the captured telematics data of the mobile telematics devices associated with the motor vehicles. This alternative embodiment has, inter alia, the advantage that it allows to provide a real-time adapted multi-tier risk-transfer system. Further, it allows to capture and/or control the scores driver behavior, and compare its behavior within the technical operation and context. It allows to automatically capture score risks according to location or trip, and to automatically analyze and react on data related to the need of added services, as e.g. accident notifications).

In one alternative embodiment, the machine-learning based circuit comprises additional triggers triggering accident notification and/or other added services based on the captured telematics data of the mobile telematics devices associated with the motor vehicles. This alternative embodiment has, inter alia, the advantage that the system is capable of providing additional benefit to the customer based on additionally generated signaling.

In another alternative embodiment, the switching device comprises capturing means for capturing a transfer of payment from the first insurance system to the second payment-transfer module, wherein the second layer trigger structure of the system is activatable by triggering a payment transfer matching a predefined activation threshold parameter. In another embodiment variant, in the case of triggering the occurrence of a loss associated with the occurrence of the defined risk events, a predefined defined portion of the occurred loss covered by the second insurance system based on the second risk transfer parameters and correlated second payment transfer parameters. Thus, the present invention can be realized with a proportional or a non-proportional risk-transfer as coupling mechanism between the first and second risk-transfer systems, wherein under proportional risk-transfer coupling, the second risk-transfer system is activated by means of the switching device by a fixed percentage share of each risk transferred to the first risk-transfer system respectively each loss transferred to the risk-transfer system. Accordingly, the second risk-transfer system receives that fixed payment transfer from the first risk-transfer system by means of the second payment parameters. Under non-proportional risk-transfer coupling, the in the case of triggering the exceedance of a defined activation threshold parameter associated with the occurrence of the defined risk events, the occurred loss is at least partly covered by the second insurance system based on the second risk transfer parameters and correlated second payment transfer parameters. The activation threshold can be associated with each single loss occurred or on the accumulated loss measured by means of the aggregated loss parameter. Thus, the non-proportional coupling can be realized in an excess of loss or stop loss risk-transfer structure, wherein the excess of loss structure can e.g. be based on a Per Risk XL (Working XL), Per Occurrence/Per Event XL (Catastrophe or Cat XL), or Aggregate XL structure. As a more particular alternative embodiment, a periodic payment transfers from the risk exposure components to the resource pooling system via a plurality of payment receiving modules is requested by means of a monitoring module of the resource-pooling system, wherein the risk transfer or protection for the risk exposure components is interrupted by the monitoring module, when the periodic transfer is no longer detectable via the monitoring module. As an alternative, the periodic payment transfer request can be interrupted automatically or waived by the monitoring module, when the occurrence of indicators for a risk event is triggered in the data flow pathway of a risk exposure component. These alternative embodiments have, inter alia, the advantage that the system allows for further automation of the monitoring operation, especially of its operation with regard to the pooled resources.

In another alternative embodiment, an independent verification risk event trigger of the first and/or second resource pooling system is activated in cases when the occurrence of indicators for a risk event is triggered in the data flow pathway of the telematics devices by means of the risk event triggers, and wherein the independent verification risk event trigger additionally issues a trigger in the event of the occurrence of indicators regarding risk events in an alternative data flow pathway with independent measuring parameters from the primary data flow pathway, e.g. of alternative telematics devices, in order to verify the occurrence of the risk events at the risk exposed motor vehicles. In this alternative, the transfer of payments is only assigned to the corresponding risk exposed motor vehicle if the occurrence of the risk event at the risk exposure component is verified by the independent verification risk event trigger. These alternative embodiments have, inter alia, the advantage that the operational and financial stability of the system can thus be improved. In addition, the system is rendered less vulnerable to fraud and counterfeit.

In general, the system can for example comprise capturing means that capture a payment transfer assigned to one of the two risk transfer systems, e.g. also from the first insurance system to the second payment transfer module, wherein the assigned insurance system is activated, and wherein the risk exposure of the first insurance system associated with the assigned risk transfer layer is transferred to the second insurance system. This alternative embodiment has, inter alia, the advantage that additionally the second insurance system distinctively can be activated, allowing a controlled and discrete risk transfer and risk cover from the first to the second resource pooling system.

In another alternative embodiment, the first insurance system comprises an interface module for accessing and adapting the assigned operational parameters prior to the transfer of the payment parameters from the first resource pooling system to the second resource pooling system. This alternative embodiment has, inter alia, the advantage that the risk transfer structure can be dynamically adjusted and, moreover, selected and/or additionally optimized directly by the first insurance system or the second insurance system.

In still another alternative embodiment, the machine-learning based telematics circuit comprises means for processing risk-related motor vehicle data and for providing data regarding the likelihood of said risk exposure for one or a plurality of the pooled risk exposed motor vehicle, in particular, based on the risk-related motor vehicle data, and wherein the receipt and preconditioned storage of payments from the risk exposed motor vehicles for the pooling of their risks can be dynamically determined based on the total risk and/or the likelihood of risk exposure of the pooled risk exposed motor vehicles. This alternative embodiment has, inter alia, the advantage that the operation of the first and/or second resource pooling system can be dynamically adjusted to changing conditions in relation to the pooled risk, such as a change of the environmental conditions or risk distribution, or the like, of the pooled motor vehicles. A further advantage is that the system does not require any manual adjustments, when it is operated in different environments, places or countries, because the size of the payments of the risk exposed motor vehicles is directly related to the total pooled risk. However, it is important to note, that the present invention does not necessarily have to lead to adjusted pricing or premiums. For example, it could also automatically provide coupons to drivers that drive well, or that nothing at all changes but that the system uses the telematics data to automatically decide if the risk-transfer is continued the next year. The present invention can also exclusively be used for automatically providing and activating adapted and/or specifically selected value added services, as e.g. accident notifications and/or feedback to the driver and/or automated fleet risk reporting and/or automated and dynamically optimized underwriting etc. Thus, the present invention allows an adaption of the risk of the first risk-transfer tier or system as well as risk on level of the insured motor vehicles (e.g. by risk-based driver feedback in real-time) and/or the second risk-transfer tier or system. There is no prior art system, allowing such an optimization and/or adaption. The driver feedback can e.g. be generated by comparing the driver's profile and pattern with other driver's profiles or pattern at the same location and/or comparable conditions.

In one alternative embodiment, the system comprises means for processing risk-related component data and for providing information regarding the likelihood of said risk exposure for one or a plurality of the pooled risk exposed motor vehicles, in particular, based on risk-related motor vehicles' data, and wherein the receipt and preconditioned storage of payments from the first resource pooling system to the second resource pooling system for the transfer of its risk can be dynamically determined based on the total risk and/or the likelihood of risk exposure of the pooled risk exposure components. This alternative embodiment has, inter alia, the advantage that the operation of the first and/or second resource pooling system can be dynamically adjusted to changing conditions of the pooled risk, such as changes of the environmental conditions or risk distribution, or the like, of the pooled risk components. A further advantage is the fact that the system does not require any manual adjustments, when it is operated in different environments, places or countries, because the size of the payments of the risk exposure components is directly related to the total pooled risk.

In one alternative embodiment, the number of pooled motor vehicles is dynamically adjusted via the first risk-transfer system to a range where non-covariant, occurring risks covered by the risk-transfer system affect only a relatively small proportion of the total pooled risk exposure components at any given time. Analogously, the second risk-transfer system can for example dynamically adjust the number of pooled risk shares transferred from first risk-transfer systems to a range where non-covariant, occurring risks covered by the second risk-transfer system affect only a relatively small proportion of the total pooled risk transfers from first risk-transfer systems at any given time. This variant has, inter alia, the advantage that the operational and financial stability of the system can be improved.

In one alternative embodiment, the risk event triggers are dynamically adjusted by means of an operating module based on time-correlated incidence data for one or a plurality of the predefined risk events. This alternative embodiment has, inter alia, the advantage that improvements in capturing risk events or avoiding the occurrence of such events, for example by improved forecasting systems, etc., can be dynamically captured by the system and dynamically affect the overall operation of the system based on the total risk of the pooled risk exposure components.

In another alternative embodiment, upon each triggering of an occurrence, where parameters indicating a predefined risk event are measured, by means of at least one risk event trigger, a total parametric payment is allocated with the triggering, and wherein the total allocated payment is transferable upon a triggering of the occurrence. The predefined total payments can for example be leveled to any appropriate defined total sum, such as a predefined value, or any other sum related to the total transferred risk and the amount of the periodic payments of the risk exposed motor vehicle. This alternative has, inter alia, the advantage that the parametric payments or the payments of predefined amounts can be relied on fixed amounts. Further, the parametric payment may allow for an adjusted payment of the total sum that can for example be dependent on the stage of the occurrence of a risk event, as triggered by the system.

In addition to the system, as described above, and the corresponding method, the present invention also relates to a computer program product that includes computer program code means for controlling one or more processors of the control system such that the control system performs the proposed method; and it relates, in particular, to a computer program product that includes a computer-readable medium that contains the computer program code means for the processors.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
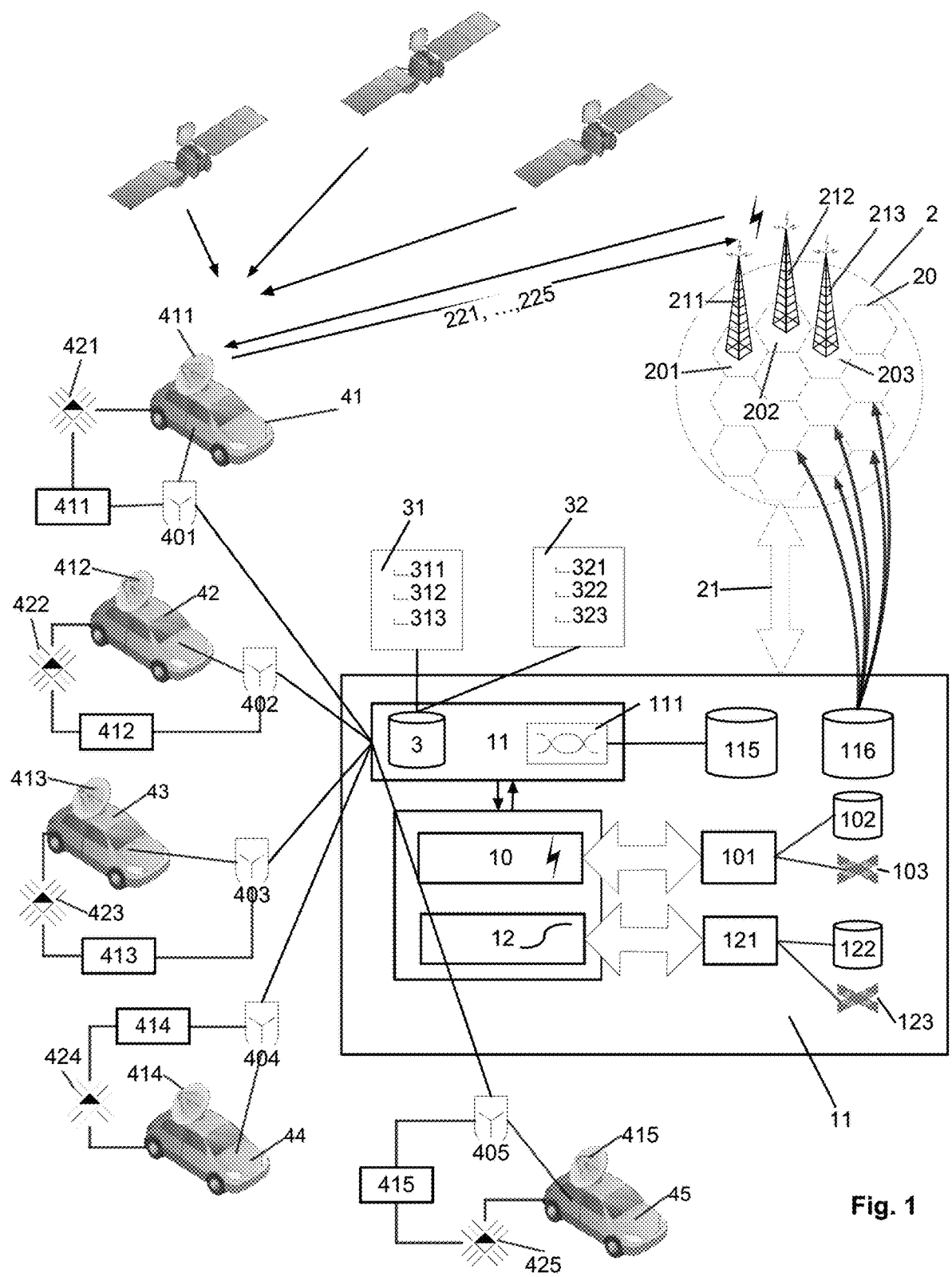
FIG. 1 shows a block diagram schematically illustrating an exemplary telematics-based, dynamic triggered, multi-tier risk-transfer system provided by the inventive telematics system 1 with mobile telematics devices 401, . . . , 405 associated with a plurality of motor vehicles 41, . . . , 45 capturing measuring parameters in real-time and dynamically adapting its operational parameters. In particular, it shows a machine-learning based or expert-system based telematics system. The telematics devices 401, . . . , 405 comprising one or more wireless connections 411, . . . , 415 and a plurality of interfaces 421, . . . , 425 for connection with at least one of a vehicle's data transmission bus and/or with sensors 4011 and/or measuring devices 4012 and/or speakers 4013 and/or microphones 4014. The telematics devices 401, . . . , 405 are connected to an on-board diagnostic system 431, . . . , 435 and/or an in-car interactive device 441, . . . , 445 and/or a monitoring cellular mobile node application 451, . . . , 455, wherein the telematics devices 401, . . . , 405 capture usage-based 31 and/or user-based 32 telematics data 3 of the motor vehicle 41, . . . , 45 and/or user 321, 322, 323, and transmit them via the data transmission network 2 to the machine-learning based telematics circuit 11, which operates the coupled first and second risk-transfer systems by means of the dynamically optimized the first and second risk transfer parameters and the correlated first and second payment transfer parameters 1021, . . . , 1025/1221, . . . , 1225. The telematics devices 401, . . . , 405 can also be realized as an integrated part of a monitoring cellular mobile phone.
Figure 2:
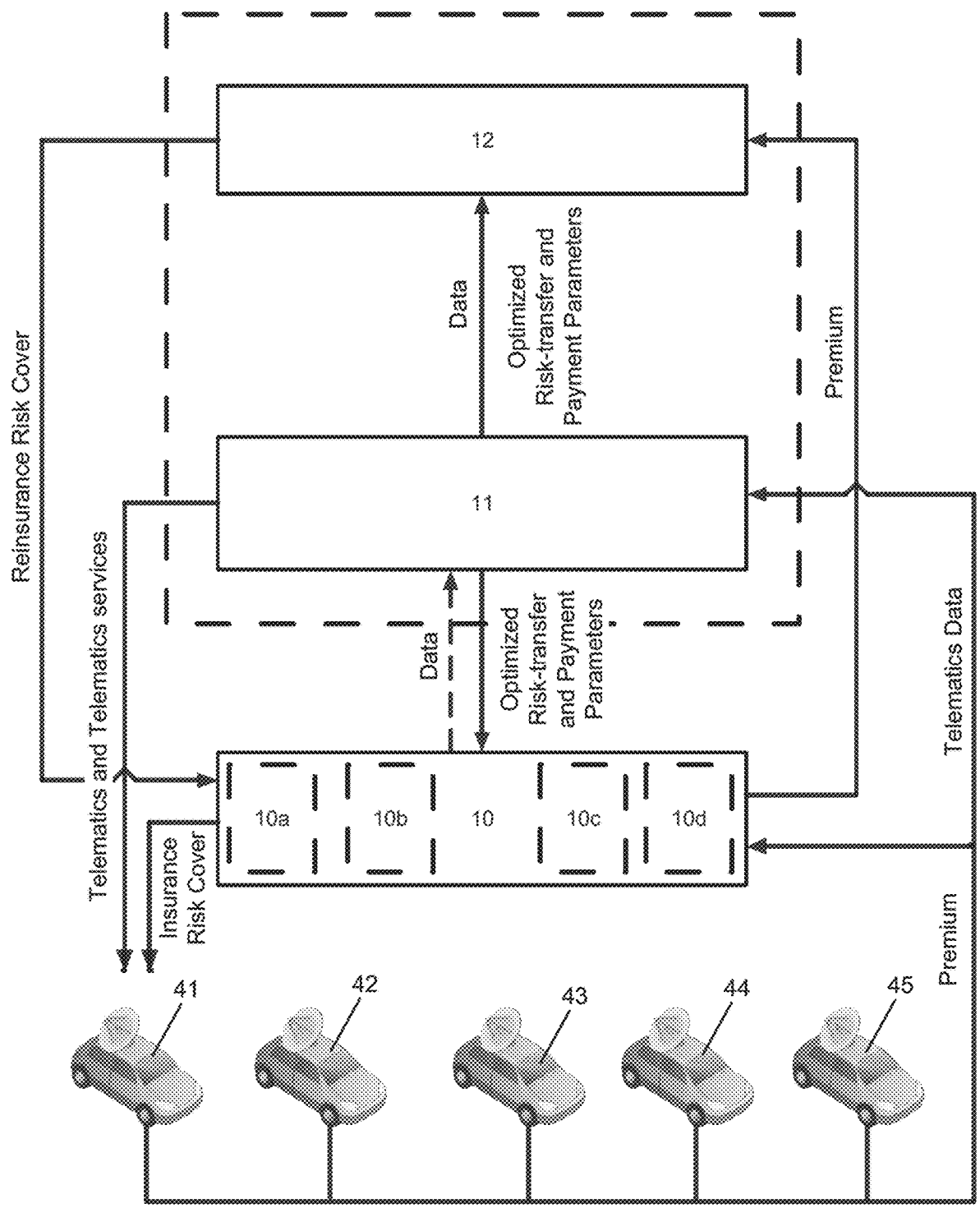
FIG. 2 shows a block diagram schematically illustrating an exemplary dynamically adaptable telematics system 1 with mobile telematics devices 401, . . . , 405 associated with a plurality of risk-exposed motor vehicles 41, . . . , 45, according an embodiment variant of the invention. In particular, it shows a machine-learning based or expert-system based telematics system. The telematics devices 401, . . . , 405 capture usage-based 31 and/or user-based 32 telematics data 3 of the motor vehicle 41, . . . , 45 and/or user 321, 322, 323, and transmit them via the data transmission network 2 to the machine-learning based telematics circuit 11, which operates the coupled first and second risk-transfer systems by means of the dynamically optimized the first and second risk transfer parameters and the correlated first and second payment transfer parameters 1021, . . . , 1025/1221, . . . , 1225. The system 1 is capable of capturing different kinds of telematics data 3, as also e.g. driving behavior from the user and/or whether the motor vehicle 41, . . . , 45 is driving itself (auto piloting) and/or the motor vehicle 41, . . . , 45 is intervening with its automated or safety features. The latter is possible, if the mobile telematics device 401, . . . , 405 capture data 3 from the motor vehicle 41, . . . , 45 itself. Thus, the mobile telematics device 401, . . . , 405 or mobile phone apps connected to mobile telematics device 401, . . . , 405 can generate data 3 itself by means of own sensors, and/or the mobile telematics device 401, . . . , 405 or mobile phone apps connected to mobile telematics device 401, . . . , 405 can comprise access to data directly from the motor vehicle 41, . . . , 45, e.g. provided by an on-board diagnostic system. As seen from FIG. 2, the machine-learning based telematics circuit 11 may be realized as a separate part of the telematics system 1, or as a part of the second risk-transfer system 12, wherein in the latter case, the mobile telematics devices 401, . . . , 405 are provided by the second risk-transfer system 12 to the first risk-transfer system 10 and/or the risk exposed motor vehicles 41, . . . , 45, in exchange of having access to the captured telematics data 3 and/or captured claim or loss data. As also illustrated by FIG. 2, the telematics system 1 may comprise one 10 or a plurality of first risk-transfer system 10a-10d, all associated with the same second risk-transfer system 12.
Figure 3:
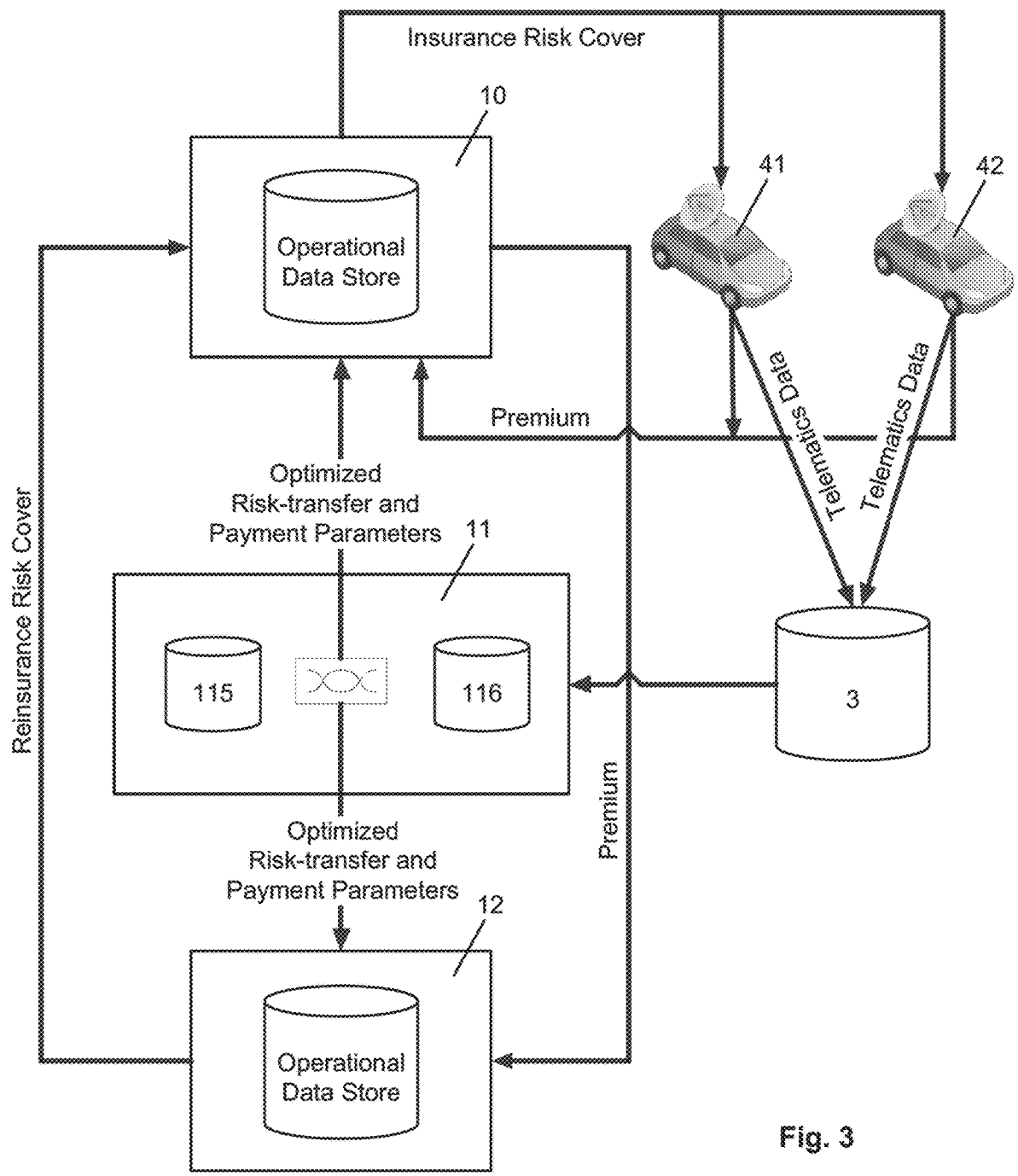
FIG. 3 shows another block diagram schematically illustrating an exemplary dynamically adaptable telematics system 1 with mobile telematics devices 401, . . . , 405 associated with a plurality of risk-exposed motor vehicles 41, . . . , 45, according an embodiment variant of the invention. In particular, it shows a machine-learning based or expert-system based telematics system. The telematics devices 401, . . . , 405 capture usage-based 31 and/or user-based 32 telematics data 3 of the motor vehicle 41, . . . , 45 and/or user 321, 322, 323, and transmit them via the data transmission network 2 to the machine-learning based telematics circuit 11, which operates the coupled first and second risk-transfer systems by means of the dynamically optimized the first and second risk transfer parameters and the correlated first and second payment transfer parameters 1021, . . . , 1025/1221, . . . , 1225
Figure 4:
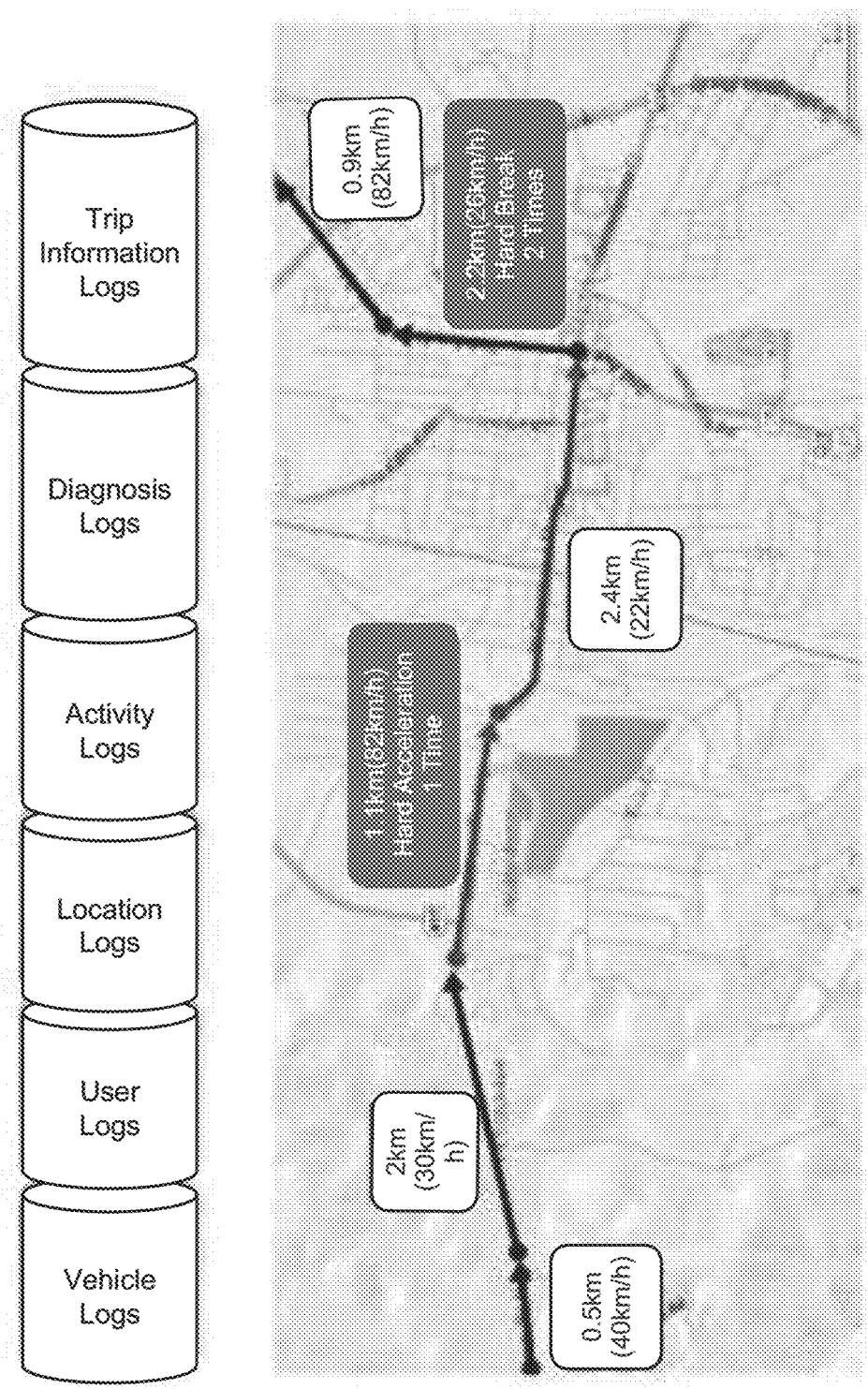
FIG. 4 shows a block diagram schematically illustrating exemplary mobile telematics devices 401, . . . , 405 and real-time telematics data capturing.

FIG. 1 schematically illustrates an architecture for a possible implementation of an embodiment of the telematics-based, dynamic triggered, multi-tier risk-transfer system 1 with an event-triggered activation for complementary switching of two coupled, autonomously operated risk-transfer systems 10, 12. In particular, it shows a machine-learning based or expert-system based telematics system. The risk-transfer system 10 can correspond to an automated insurance system and the risk-transfer system 12 can correspond to an automated reinsurance system. The system 1 is realizing a dynamic triggered and adjusted, multi-tier risk-transfer system based on the machine-learning based telematics system 1, thereby reinforcing the importance of developing automated real-time systems allowing self-sufficient and optimized multi-tier risk-transfer operation. Multi-tier risk-transfer is realized by the coupled first and second risk-transfer or insurance system 10, 12. The system 1 is triggered, i.e. dynamically tuned and adapted to trigger activation of the first and second insurance system 10/12 based on capture usage-based 31 and/or user-based 32 telematics data 3 of the motor vehicle 41, ..., 45 and/or user 321, 322, 323. The usage-based 31 and/or user-based 32 telematics data 3 comprise at least telematics data on when and/or how often and/or where and/or how the driver is driving and/or what the motor vehicle 41, ..., 45 is doing and to what extent safety, automated, or autonomous features are active. The telematics data 3 are captured by the mobile telematics device 401, ..., 405 by means connected or integrated sensors and measuring devices.

The system 1 with the first and second risk-transfer systems 10, 12 provide automated, self-sufficient risk protection of a variable number of risk exposed motor-vehicles 41, ..., 45 by means of two associated, automated resource pooling systems 101, 121. I.e., the first risk-transfer system 10 comprises an automated first resource pooling system 101 and the second risk-transfer system 12 comprises an automated second resource pooling system 121. The risk exposed motor vehicles 41, ..., 45 are connected to the first resource pooling system 101 by means of the plurality of payment transfer modules 103 configured to receive and store 102 first payments 1021, ..., 1025 from the risk exposed motor vehicles 41, ..., 45 for the pooling of their risk exposures, wherein the first risk-transfer system 10 provides the automated risk protection for each of the connected risk exposed motor vehicles 41, ..., 45 based on received and stored first payment parameters 1021, ..., 1025. Further, the first risk-transfer system 10 is connected to the second resource pooling system 121 by means of second payment transfer modules 123 configured to receive and store 122 second payment parameters 1221, ..., 1225 from the first insurance system 10 for adopting of a portion of the risk exposures accumulated by the first risk-transfer system 10. Thus, in the case of the occurrence of one of defined risk events the occurred loss is automatically covered by the machine-learning based telematics system 1 comprising the first and second risk-transfer systems 10/12.

The automated resource pooling systems 101, 121 comprise the first and second payment data store 102, 122 for their operation allowing a secure payment parameter storage of stored first payment parameters 1021, ..., 1025 and stored second payment parameters 1221, ..., 1225, respectively. In FIG. 1, reference numeral 1 refers to the dynamic triggered system for providing optimized risk protection related to risk exposed motor vehicles 41, ..., 45 with the associated coupled resource pooling systems 101, 121. The resource pooling systems 101, 121 can e.g. be coupled, steered and/or operated by means of the machine-learning based or expert-system based or artificial intelligence based telematics circuit 11, provide dynamic self-sufficient risk protection and a corresponding risk protection structure for the variable number of risk exposed motor vehicles 41, ..., 45; i.e., units exposed to defined risk events, wherein the occurrence of such risk events is measurable and triggerable by means of the mobile telematics devices 401, ..., 405 and/or appropriate measuring devices and/or trigger modules triggering in the data flow pathway of telematics devices 401, ..., 405; i.e., measuring parameters of the telematics devices 401, ..., 405. At least some of the mobile telematics devices 401, ..., 405 can comprise secured means for saving processor-driving operation code and flash memory the reading and capturing of the telematics data 3. At least some of the telematics data 3, captured mobile telematics devices 401, ..., 405, are measured by means of sensors comprising at least an accelerometer to measure the motor vehicle's g-force during acceleration, braking, and cornering and/or global positioning system (GPS) to record location data and to calculate driving distances. The mobile telematics devices 401, ..., 405 can also comprise further parameter measuring devices as e.g. devices for measuring speed (maximum speed, speeding, time spent in speed bands), breaking (harsh braking, number of brake applications, braking distance), acceleration, cornering, distance (e.g. odometer reading), mileage (e.g. used for pay as you drive or distance based risk pricing), short journey, time of day, road and terrain type, mobile phone usage (while driving), weather/driving conditions, location (GPS, triangulation), temperature, blind spot, local driving, sun angle and dazzling sun information (sun shining in drivers' face), seatbelt status, rush hour use, fatigue (e.g. measured by eye trackers or the like), driver confidence, throttle position, lane changing, fuel consumption (per trip and average fuel economy), quantification data points, Vehicle identification Numbers (VIN), slalom (no straight line driving), Revolutions Per Minute RPM (excessive RPM, max RPM, time in RPM bands), off road usage, G forces, brake pedal position, driver alertness, Controller Area Network (CAN) bus parameters including fuel level, distance to other vehicles, distance to obstacles, activated/usage of automated features, activated/usage of Advanced Driver Assistance Systems, traction control data, usage of headlights and other lights, usage of blinkers, vehicle weight, amount of vehicle passengers, traffic sign information, junctions crossed, jumping of orange and red traffic lights, alcohol level detection devices, drug detection devices, driver distraction sensors, driver aggressiveness, biometric information or measuring parameters, driver mental and emotional condition, dazzling headlights from other vehicles, vehicle door status (open/closed), visibility through windscreens, lane position, lane choice, vehicle safety, driver's mood, passengers' mood, $CO^2$ emissions (total emissions based on the amount of fuel consumed), Power Take Off (PTO; refers to the activity of any motorized device that is connected to a vehicle), engine hours, oil pressure, water temperature, idle time and/or warm-up idle time. The measurement of the above telematics data by means of the mobile telematics devices 401, ..., 405 can e.g. be subject to their availability on the vehicle CAN bus, wherein the Controller Area Network bus is a vehicle bus standard designed to allow microcontrollers and devices to communicate with each other in applications without a host computer. It is a message-based protocol, designed for multiplex electrical wiring within automobiles, however, CAN buses are also used in other contexts.

Further, the dynamically triggered system 1 can e.g. include at least one processor and associated memory modules. The machine-learning based telematics system 1 can also include one or more display units and operating elements, such as a keyboard and/or graphic pointing devices, such as a computer mouse. The resource pooling systems 101 and 121 are technical devices comprising electronic means that can be used by service providers in the field of risk transfer or insurance technology for the purpose of risk transfer as it relates to the occurrence of measurable risk events. The invention seeks to capture, handle, automate, and optimize by telematics, related operations of the automated insurance systems 10, 12, in particular in an effort to optimize the interaction of coupled systems 10, 12, and to reduce the operational requirements. Another aspect that is addressed is finding ways to synchronize and adjust such operations related to coupling or mutually activating of resource pooling systems 101, 121, which are directed at proved risk protection of risk exposed units based on technical means. In contrast to the standard practice, the resource pooling systems 101, 121 also achieve reproducible, dynamically adjustable real-time operations based on telematics data with the desired technical, repeating accuracy, because it is completely based on technical means, a process flow and process control/operation.

The dynamic triggered, multi-tier risk-transfer system is provided by means of the machine-learning based telematics system 1 with mobile telematics devices 401, . . . , 405 associated with a plurality of motor vehicles 41, . . . , 45. The machine-learning based telematics system 1 triggers, signals, and mutually activates a first and second risk-transfer tiers 10/12 providing a self-sufficient risk protection for a variable number of risk exposed motor vehicles 41, . . . , 45 by means of a first and second resource pooling system 101/121. The first and second risk-transfer tiers 10/12 can be realized as coupled, automated first and second insurance systems 10/12. The risk exposure components 21, 22, 23, . . . are connected to the first resource pooling system 101 by means of a plurality of payment transfer modules 103 configured to receive and store 102 first payment parameters 1021, . . . , 1025 by means of the first data store 102 from the risk exposed motor vehicles 41, . . . , 45, . . . for the pooling of their risk exposures. The first insurance system 10 provides automated risk protection for each of the connected risk exposed motor vehicles 41, . . . , 45 based on received and stored first payment parameters 1021, . . . , 1025. The first insurance system 10 is connected to the second resource pooling system 121 by means of second payment transfer modules 123 configured to receive and store 122 second payment parameters 1221, . . . , 1225 from the first insurance system 10 for adopting of a portion of the risk exposures 5 accumulated by the first insurance system 10. In the case of the occurrence of one of defined risk events the occurred loss is automatically covered by the first insurance system 10.

The mobile telematics devices 401, . . . , 405 associated with the plurality of motor vehicles 41, . . . , 45 comprising one or more wireless connections 411, . . . , 415, and a plurality of interfaces 421, . . . , 425 for connection with at least one of a vehicle's data transmission bus, and/or a plurality of interfaces for connection with appropriate sensors 4011 and/or measuring devices 4012 and/or speakers 4013 and/or microphones 4014. The sensors and measuring devices can comprise means for capturing various data, as described below. The telematics devices 401, . . . , 405 can e.g. provide the one or more wireless connections 411, . . . , 415 by means radio data systems (RDS) modules 4111 and/or positioning system 4112 including a satellite receiving module 4115 and/or a mobile telephone 4113 including a digital radio service module and/or a language unit 4114 in communication the radio data system 4111 or the positioning system 4112 or the cellular telephone module 4113. However, as special embodiment variant, the telematics devices 401, . . . , 405 can also comprise a wired permanent or periodic connection, e.g. by a periodic data transfer by means of an USB flash drive, as discussed further below. The satellite receiving module 4115 can e.g. comprises a Global Positioning System (GPS) circuit 4116 and/or the digital radio service module 4111 can e.g. comprises at least a Global System for Mobile Communications (GSM) unit 4116. For telematics, Radio Data System (RDS) denotes a communications protocol standard for embedding amounts of digital information in conventional Frequency Modulation (FM) radio broadcasts. RDS standardizes several types of information transmitted, including time, station identification and program information. Radio Broadcast Data System (RBDS) is the official name used for the U.S. version of RDS. For the wireless connection 411, . . . , 415, the telematics devices 401, . . . , 405 acts as wireless node 221, . . . , 225 within a corresponding data transmission network 2 by means of antenna connections of the telematics device 401, . . . , 405.

On the other side, the telematics devices 401, . . . , 405 can be connected to an on-board diagnostic system 431, . . . , 435 and/or an in-car interactive device 441, . . . , 445 and/or a monitoring cellular mobile node application 451, . . . , 455 and/or be included as integrated part in a mobile device as a smartphone. Thus, as a variant, the telematics devices 401, . . . , 405 can built an integrated part of a cellular mobile phone, wherein cellular mobile phone comprises all needed measuring devices to capture the telematics data 3. At least some of the mobile telematics devices 401, . . . , 405 can e.g. connected to mobile phone applications (smartphone apps) 451, . . . , 455, wherein the associated mobile phone 4113 comprises the mobile telematics devices 401, . . . , 405, as e.g. a global positioning system (GPS) circuit 4116 and/or mobile network triangulation means providing monitoring of travel speed, frequency of travel, location, and driving style), and wherein the mobile phone's network connection are used to transmit the captured telematics data 3 to the machine-learning based telematics circuit 11. The mobile telematics devices 401, . . . , 405, e.g. connected to the on-board diagnostic (OBD) system 431, . . . , 435 may provide an appropriate monitoring of the vehicle's systems and/or subsystems. The connection e.g. to the on-board diagnostic (OBD) system 431, . . . , 435 of the mobile vehicle 41, . . . , 45 can be provided by plugging in a data transmission wire into an appropriate port of the on-board diagnostic system 431, . . . , 435. As mentioned, the at least some of the mobile telematics devices 401, . . . , 405 can also be connected to an in-car interactive device 441, . . . , 445, wherein for example the vehicle's speed and travel distances is monitored by a global positioning system (GPS) circuit 4116 and wherein the telematics data 3 are transmitted form the mobile telematics device 401, . . . , 405 to the machine-learning based telematics circuit 11 by means of a cellular telecommunication connection. Some of the mobile telematics devices 401, . . . , 405 can e.g. comprise speakers and a voice connection from the machine-learning based telematics circuit 11 and/or the first and/or second risk-transfer system 10/12 to the mobile telematics device 401, . . . , 405 thereby providing real-time coaching-services to the user of the motor vehicle 41, . . . , 45 on their driving skills and/or other usage-based 31 or user-based 32 behaviors. In summary, the telematics devices 401, . . . , 405 can e.g. comprise sensors or other measuring devices, On-Board-Diagnose (OBD) systems or dongle, smartphone and/or mobile cellular phone, windscreen device (as e.g. cameras), black box devices, cigarette lighter adaptor (CLA) device, eCall OBU, embedded OEM devices and/or infotainment system, smartphone projection standards to allow mobile devices running a certain operating system to be operated in automobiles through the dashboard's head unit (examples may include Apple Carplay, Mirrorlink, Android Auto), on-board navigation systems, navigation devices, Aftermarket Advanced Driver Assistance Systems (examples may include Mobileye), Embedded Advanced Driver Assistance Systems (examples may include Advanced emergency braking systems, Lane Departure Warning systems, Parking Assist features), vehicular automation systems (examples may include Autopilot systems, Remote Valet Parking Assistant or Autonomous Parking Assistant), smartwatches and other wearable. The telematics devices 401, . . . , 405 may also comprise specific combined features of the above mentioned devices as e.g. smartphone (App) with beacon or Bluetooth Low Energy (BLE) beacon (BLE, also known as Bluetooth Smart) is a wireless personal area network technology mainly designed for novel applications in the healthcare, fitness, beacons, security, and home entertainment industries. Compared to the classic Bluetooth, Bluetooth Smart is intended to provide considerably reduced power consumption and cost while maintaining a similar communication range (around 10 m), smartphone with OBD dongle or BLE enabled OBD dongle, smartphone only, self-installable aftermarket black box, professionally-installed aftermarket black box, aftermarket black-box & display In this way, the telematics devices 401, . . . , 405 capture usage-based 31 and/or user-based 32 telematics data 3 of the motor vehicle 41, . . . , 45 and/or user 321, 322, 323, and transfer them over the data transmission network 2 to the machine-learning based telematics system. In particular, the plurality of mobile telematics devices 401, . . . , 405 associated with the motor vehicles 41, . . . , 45 are connected to a machine-learning based telematics circuit 11, wherein a data link 21 is set by means of the wireless connection 411, . . . , 415 between the machine-leaning based telematics circuit 11 transmitting at least the captured usage-based 31 and/or user-based 32 telematics data 3 from the mobile telematics devices 401, . . . , 405 to the machine-learning based telematics circuit 11. At least some of the mobile telematics devices 401, . . . , 405 can e.g. comprise a cellular modem 4113 to transmit the telematics data 3 form the mobile telematics device 401, . . . , 405 to the machine-learning based telematics circuit 11. However, as a special embodiment variant, the mobile telematics devices 401, . . . , 405 associated with the plurality of motor vehicles 41, . . . , 45 do not comprise a wireless connections 411, . . . , 415, but transmit the telematics data 3 e.g. by being connected on a periodical basis to a wired (fixed) network, as e.g. a Local Area Network (LAN), or by being connected to a data transmission or network station, as e.g. a personal computer, via a Universal Serial Bus (USB) or an intermediate USB devices or USB computer peripherals as an USB flash drive or other portable data storage device. The plurality of interfaces 421, . . . , 425 for connection with at least one of a motor vehicle's data transmission bus can e.g. comprise at least on interface for connection with a motor vehicle's Controller Area Network (CAN) bus.

As described above, the machine-learning based telematics system 1 comprises one or more first risk-transfer systems 10 to provide a first risk-transfer based on first risk transfer parameters from at least some of the motor vehicles 41, . . . , 45 to the first risk-transfer system 10, wherein the first risk-transfer system 10 comprises a plurality of payment transfer modules 103 configured to receive and store 102 first payment parameters 1021, . . . , 1025 associated with risk-transfer of risk exposures 5 of said motor vehicles 41, . . . , 45 for pooling of their risks. By means of the machine-learning based circuit 11 of the telematics system 1 risk-related telematics data 3, captured from the mobile telematics devices 401, . . . , 405, are processed, wherein first risk transfer parameters and correlated first payment transfer parameters 1021, . . . , 1025 are generated by means of the machine-learning based telematics circuit 11 and transmitted to the first risk-transfer system 10. In the case of triggering the occurrence of one of defined risk events associated with transferred risk exposure of the motor vehicles 41, . . . , 45, the occurred loss 71, . . . , 75 is automatically covered by the first risk-transfer system 10 based on the first risk transfer parameters and correlated first payment transfer parameters 1021, . . . , 1025.

Further, the machine-learning based telematics system 1 comprises a second risk-transfer system 12 to provide a second risk-transfer based on second risk-transfer parameters from one or more of the first risk-transfer systems 10 to the second risk-transfer system 12, wherein the second risk-transfer system 12 comprises second payment transfer modules 123 configured to receive and store 122 second payment parameters 1221, . . . , 1225 for pooling of the risks of the first risk-transfer systems 10 associated with risk exposures transferred to the first risk-transfer systems 10. For the operation of the second risk-transfer system 12, second risk transfer parameters and correlated second payment transfer parameters 1221, . . . , 1225) are generated by means of the machine-learning based telematics circuit 11 and transmitted to the second risk-transfer system 12, wherein, in the case of triggering the exceedance of a defined activation threshold parameter 124 associated with the occurrence of the defined risk events, the occurred loss 71, . . . , 75 is at least partly covered by the second insurance system 12 based on the second risk transfer parameters and correlated second payment transfer parameters 1221, . . . , 1225. For example, in the case of triggering the exceedance of the defined activation threshold parameter 124, the second risk-transfer system 12 is automatically activated by transferring activation signaling by means of the system 1 to the second insurance system 12 covering, upon activation, said adopted portion of risk exposures accumulated by the first insurance system 10. However, it is explicitly to be mentioned, that the present invention, as embodiment variant can be realized with a fixed activation, i.e. without triggering an activation threshold. Thus, the present invention can be realized with a proportional or a non-proportional risk-transfer as coupling mechanism between the first and second risk-transfer systems 10/12, wherein under proportional risk-transfer coupling, the second risk-transfer system 12 is activated by means of the switching device 11 by a fixed percentage share of each risk transferred to the first risk-transfer system 10. Accordingly, the second risk-transfer system 12 receives that fixed payment transfer from the first risk-transfer system 10 by means of the second payment parameters 1221, . . . , 1225. Under non-proportional risk-transfer coupling, the in the case of triggering the exceedance of a defined activation threshold parameter 124 associated with the occurrence of the defined risk events, the occurred loss 71, . . . , 75 is at least partly covered by the second insurance system 12 based on the second risk transfer parameters and correlated second payment transfer parameters 1221, . . . , 1225. The activation threshold can be associated with each single loss occurred or on the accumulated loss measured by means of the aggregated loss parameter. Thus, the non-proportional coupling can be realized in an excess of loss or stop loss risk-transfer structure, wherein the excess of loss structure can e.g. be based on a Per Risk XL (Working XL). Per Occurrence/Per Event XL (Catastrophe or Cat XL), or Aggregate XL structure. The first and second risk transfer parameters and the correlated first and second payment transfer parameters 1021, . . . , 1025/1221, . . . , 1225 are dynamically adapted and/or mutually optimized by means of the machine-learning based telematics circuit 11 based on the captured usage-based 31 and/or user-based 32 telematics data 3 from the mobile telematics devices 401, . . . , 405 associated with the plurality of motor vehicles 41, . . . , 45 and based on the pooled risks 5 of the first risk transfer systems 10. The machine-learning based telematics circuit 11 can e.g. comprises an aggregation module providing the risk exposure for one or a plurality of the pooled risk exposed motor vehicles 41, . . . 0.45 based on the captured risk-related telematics data 3, wherein the first and second risk transfer parameters and the correlated first and second payment transfer parameters 1021, . . . , 1025/1221, . . . , 1225 are dynamically generated based on the likelihood of the occurrence of the predefined risk events of the pooled motor vehicles 41, . . . , 45.

Concerning the non-proportional coupling of the first and second risk-transfer systems 10/12 of the system 1 by means of the switching device 11, the mentioned aggregation module 114 of the telematics system 1 can e.g. automatically aggregate the captured loss parameters of measured occurrence of risk events over all risk exposed motor vehicles 41, . . . , 45 increments an associated stored aggregated loss parameter within a predefined time period 1141 and automatically aggregates the received and stored first payment parameters 1021, . . . , 1025 over all risk exposure components 41, . . . , 45 within the predefined time period 1141 by incrementing an associated stored, aggregated payment parameter, wherein the variable loss ratio parameter dynamically is generated based upon the ratio of the aggregated loss parameter and the aggregated payment parameter, and wherein the first and second risk transfer parameters and the correlated first and second payment transfer parameters 1021, . . . , 1025/1221, . . . , 1225 are dynamically generated based on the likelihood of the occurrence of the predefined risk events of the pooled motor vehicles 41, . . . , 45 and the variable loss ratio parameter. As an embodiment variant, in case of triggering the variable loss ratio parameter exceeding a loss ratio threshold value, the first and second risk transfer parameters and the correlated first and second payment transfer parameters 1021, . . . , 1025/1221, . . . , 1225 are dynamically adapted and/or optimized based on the likelihood of the occurrence of the predefined risk events of the pooled motor vehicles 41, . . . , 45) and the variable loss ratio parameter. The triggering of the exceedance of the defined the activation threshold parameter 124 can e.g. be associated with triggered value of the accumulated occurrence of measured risk events.

As another embodiment variant, the risk exposed motor vehicles 41, . . . , 45 can e.g. be connected to the first risk-transfer system 10 transferring risk exposure associated with the occurrence of defined risk events from the risk exposed motor vehicle 41, . . . , 45 to the risk-transfer insurance system 10 by means of dynamically adapted and/or optimized first risk transfer parameters and correlated dynamically aligned first payment transfer parameters 1021, . . . , 1025, wherein the first risk-transfer system 10 is connected to the second insurance system 12 by transferring risk exposure 5 associated with the occurrence of the defined risk events from the first risk-transfer system 10 to the second risk-transfer system 12 by means of dynamically adapted and optimized second risk transfer parameters and correlated dynamically aligned second payment transfer parameters 1221, . . . , 1225, and wherein, in the case of the occurrence of one of the defined risk events, loss parameters measuring the loss 71, . . . , 75 at the risk exposed motor vehicles 41, . . . , 45 are captured and transmitted to the first insurance system 10, and wherein the occurred loss 71, . . . , 75 is automatically covered by the first insurance system 10 based on the optimized first risk transfer parameters. In another variant, a loss 71, . . . , 75 associated with a predefined risk event and allocated to a pooled risk exposed motor vehicles 41, . . . , 45 can e.g. be distinctly covered by the automated resource pooling systems 101 of the first risk-transfer system 10 via a transfer of payments from the first resource pooling system 101 to said risk exposed motor vehicle 41, . . . , 45, wherein a second payment transfer from an automated second resource pooling system 121 of the second risk-transfer system 12 to the first resource pooling system 101 is triggered via the generated activation signal based on the measured actual loss of the risk exposed motor vehicle 41, . . . , 45 by the telematics system 1. Otherwise, the loss 71, . . . 75 corresponding to the risk transferred to the second risk-transfer system 12 can also be directly covered by the second resource pooling system 121 through the transfer of resources from the second resource pooling system 121 to the concerned risk exposed motor vehicle 41, . . . , 45 via the second payment transfer module 123.

To provide an even more dynamic reaction and adaptability of the system 1, the machine-learning based circuit 11 of the telematics system 1 can e.g. comprise means for processing risk-related telematics data 3 and for providing the likelihood of the occurrence of the predefined risk events of the pooled motor vehicles 41, . . . , 45 based on risk-related telematics data 3, and wherein receipt and preconditioned storage 102 of payments 1021, . . . , 1025 from the risk exposed motor vehicles 41, . . . , 45 for the pooling of their risks can dynamically, in particular in real-time, be determined based on total risk 5 and/or the likelihood of the occurrence of the predefined risk events of the pooled motor vehicles 41, . . . , 45. Further, the risk-related telematics data 3 can e.g. be processed by means of the machine-learning based circuit 11 and the likelihood of the occurrence of the predefined risk events of the pooled motor vehicles 41, . . . , 45 based on the risk-related telematics data 3 is generated, wherein receipt and preconditioned storage 102 of payments 1221, . . . , 1225 from first resource pooling system 101 to the second resource pooling system 121 for the transfer of its risk can be dynamically determined based on total risk 5 and/or the likelihood of the occurrence of the predefined risk events of the pooled motor vehicles 41, . . . , 45. In particular, the number of pooled risk exposed motor vehicles 41, . . . , 45 can e.g. dynamically and/or in real-time be adapted via the first insurance system 10 by means of the machine-learning based circuit 11 to a range where non-covariant occurring risks covered by the risk-transfer system 10 affect only a relatively small proportion of the total pooled risk exposed motor vehicles 41, . . . , 45 at any given time. The risk transfer from the first risk-transfer system 10 can also be dynamically adapted via the second risk-transfer system 12 by means of the machine-learning based circuit 11 to a range where non-covariant occurring risks covered by the second risk-transfer system 12 affect only a relatively small proportion of the total risk transferred from the first risk-transfer system 10 at any given time. In addition, the first and second risk transfer parameters and the correlated first and second payment transfer parameters 1021, . . . , 1025/1221, . . . , 1225 can e.g. be dynamically adapted by means of the machine-learning based circuit 11 based on time-correlated incidence data for one or a plurality of risk events. Finally, upon each triggering of an occurrence of captured telematics data 3 or (or based upon the) parameters 611, ..., 613/621, ..., 623/631, ..., 633 indicating a risk event 61, ..., 63 by means of the machine-learning based circuit 11, a total parametric payment is allocated with the triggering, wherein the total allocated payment is transferable when the occurrence has been triggered to the corresponding pooled risk exposed motor vehicle 41, ..., 45 affected by the measured occurrence of said risk event.

The system 1 can e.g. be fully automated, in that, in the case of the occurrence of one of defined risk events, loss parameters measuring the loss at the risk exposed motor vehicles 41, ..., 45 are automatically captured and transmitted to the first insurance system 10, and wherein the occurred loss 71, ..., 75 is automatically covered by the first insurance system (10). Further, the payment transfer can automatically be triggered and monitored, thereby influencing the operation of the system 1. For example, the system 1 can comprise a control device 1231 capturing each payment transfer from the first risk-transfer system 10 to the second payment transfer module 123, wherein the second risk-transfer system 12 of the system 1 is only activatable by triggering a payment transfer matching a predefined activation control parameter 1232.

For the dynamically adapted and/or dynamically optimized signaling of the first and second risk transfer parameters and the correlated first and second payment transfer parameters 1021, ..., 1025/1221, ..., 1225, the machine-learning based circuit 11 comprises a scores driver module 111 triggering and automatically selecting scores driver parameters 1111, ..., 1113 based on defined scores driver behavior pattern 1121, ..., 1123 by comparing captured telematics data 3 with the defined scores driver behavior pattern 1121, ..., 1123. The data components of the score can inter alia comprise customer policy details, individual driving data, crash forensics data, credit scores, statistical driving data, historic claims data, market databases, driving license points, statistical claims data, context data of weather conditions, context data of road types and/or context data of surroundings. The scores can e.g. comprise driving score, aggregated score, pricing algorithms, automated vehicle safety features, usage and operation of Advanced Driver Assistance Systems, and/or usage and operation of Autonomous Vehicle systems etc. The scores driver module 111 provides automated real-time capturing score risks according to the measured location or trip of the motor vehicle 41, ..., 45 based on the captured telematics data 3 of the mobile telematics devices 401, ..., 405 associated with the motor vehicles 41, ..., 45. This allows for real-time adaption of the first and second risk transfer parameters and the correlated first and second payment transfer parameters 1021, ..., 1025/1221, ..., 1225 according to the actual measured risks of the motor vehicles 41, ..., 45. The telematics system 1 can comprise means for contextual data processing to improve telematics scoring. This allows the system 1 to compare telematics data (location, speed, acceleration, deceleration) to the context and surrounding (e.g. weather, road types, surrounding, traffic, accidents ahead, road infrastructure, crossings, junctions, dangerous points, traffic rules, road safety classifications, driving behavior of other drivers, estimated likelihood of accidents on trip roadways, position and/or behavior of surrounding vehicles). Further, it is a concept that enables using smartphone data more reliably to score risk. An example of contextual data is the vehicle speed compared to maximum allowed speed and/or weather conditions. Driving too fast may not be as much of a risk if surrounding vehicles adopt a similar speed. However, driving at the maximum allowed speed in bad weather conditions (e.g., fog) may present dangerous driving behavior. The scores driver module 111 further allows to capture and control the scores driver behavior, and compare its behavior within the technical operation and context. It allows to automatically capture scores risks according to location or trip, and to automatically analyze and react on data related to the need of value added services, as e.g. accident notifications and/or feedback to the driver and/or automated fleet risk reporting and/or automated and dynamically optimized underwriting etc.). The telematics based feedback means of the system may e.g. comprise a dynamic alert feed via a data link to the motor vehicle's mobile telematics device 401, ..., 405, wherein the machine-learning based telematics circuit 11 heads up device alerts drivers 4015 immediately to a number of performance measures including e.g. high RPM, i.e. high revolutions per minute as a measure of the frequency of the motor rotation of the motor vehicle's engine, unsteady drive, unnecessary engine power, harsh acceleration, road anticipation, and/or ECO drive. Clearly, even the most experienced drivers can benefit from having their driving behavior dynamically analyzed and improved. The vehicle telematics system 1 provides the opportunities for improvement dynamically and in real-time, i.e. as and when they happen, related to the driver's risk behavior. Providing instant feedback to drivers through heads up training aids and get information sent straight to the mobile telematics device 401, ..., 405, ensures a two pronged approach to correcting risky (and often expensive) driving habits. Thus, the telematics system 1 not only allows to mutually optimize the operational parameters 1021, ..., 1025/1221, ..., 1225 of the first and second risk transfer system 10/12, but also optimize the risk and/or risk behavior on the level of the risk exposed motor vehicles 41, ..., 45. No prior art system allows such an integral, real-time optimization. As another value added service, the telematics system 1 can e.g. dynamically generated fleet risk reports of selected motor vehicles 41, ..., 45. Such fleet reports automated generated by the telematics system 1 provide a new approach to share and compare driver statistics. Additional advantages follow as a direct effect of such reports, as automated reward generation of top performers or identification of drivers who need extra training, etc.

Further, the occurred and triggered losses 71, ..., 75 can e.g. be automatically aggregated by means of captured loss parameters of the measured occurrence of risk events over all risk exposed motor vehicles 41, ..., 45 within a predefined time period 1141) by incrementing an associated stored aggregated loss parameter and for automatically aggregating the received and stored first payment parameters 1021, ..., 1025 over all risk exposed vehicles 41, ..., 45 within the predefined time period 1141 by incrementing an associated stored, aggregated payment parameter, and wherein the variable first and second risk transfer parameters and the correlated first and second payment transfer parameters 1021, ..., 1025/1221, ... 1225 dynamically are generated based upon the ratio of the aggregated loss parameter and the aggregated payment parameter. In summary, the first and second risk-transfer system 10/12 can be automatically steered, triggered, signaled, and mutually activated based on the dynamic-adaptable first and second risk transfer parameters and the correlated first and second payment transfer parameters 1021, ..., 1025/1221, ..., 1225 by means of the machine-learning based circuit 11, providing a self-sufficient risk protection for the variable number of motor vehicles 41, ..., 45 associated with the mobile telematics devices 401, ..., 405 by means of the coupled first and second insurance system 10/12.

In addition to the triggered payment transfers, the machine-learning based circuit 11 can e.g. comprise additional triggers 112/113 triggering accident notifications and/or feedback to the driver and/or automated fleet risk reporting and/or automated and dynamically optimized underwriting and/or other added services based on the captured telematics data 3 of the mobile telematics devices 401, ..., 405 associated with the motor vehicles 41, ..., 45. This is already described in detail above.

As indicated in FIG. 1, the dynamically triggered system 1 includes the first and second data store or storing module 102, 122 for capturing the risk-related component data and multiple functional-based modules; e.g., the payment transfer modules 103 and 123, the triggers 111, ..., 113, or the aggregation module 114. The functional modules can be implemented at least partly as programmed software modules stored on a computer readable medium, connected in a fixed or removable manner to the processors of the dynamically triggered system 1 or the associated automated systems 10,12. However, the functional modules may also be realized fully by means of hardware components, units and/or appropriately implemented modules. As illustrated in FIG. 1, the dynamically triggered system 1 and its components, in particular the first and second resource pooling systems 101, 121, the machine-learning based telematics circuit 11, the trigger 111, ..., 113, the measuring devices 401, ..., 405, with the data transfer interfaces 421, ..., 425, the aggregation module 114, and the payment transfer modules 103, 123, can be connected via a network 2, such as a telecommunications network or any other data transmission network. The network 2 can include a hard-wired or wireless network; e.g., the Internet, a GSM network Global System for Mobile Communication, a UMTS network Universal Mobile Telecommunications System and/or a WLAN Wireless Local Region Network, and/or dedicated point-to-point communication lines. In any case, the technical electronic money-related setup for the present system comprises adequate technical, organizational and procedural safeguards to prevent, contain and detect threats to the security of the structure, particularly counterfeiting threats. The resource pooling systems 101, 121 furthermore comprise all of the necessary technical means for electronic money transfer and link-up association; e.g., as initiated by one or more associated payment transfer modules 103, 123 via an electronic network. The monetary parameters can be based on any possible electronic and transfer means, such as e-currency, e-money, electronic cash, electronic currency, digital money, digital cash, digital currency, or cyber currency, etc., which can only be exchanged electronically. The first and second payment data stores 102/122 provide the means for associating and storing monetary parameters associated with a single one of the pooled risk exposed motor vehicles components 41, ..., 45. The present invention can involve the use of the aforementioned networks, such as computer networks or telecommunication networks, and/or the Internet and digital stored value systems. Electronic funds transfer EFT, direct deposit, digital gold currency and virtual currency are further examples of electronic money modalities. Also, transfers can involve technologies such as financial cryptography and technologies for enabling such transfers. For the transaction of the monetary parameters, it is preferable to use hard electronic currency, without the technical possibilities for disputing or reversing charges. The resource pooling systems 101, 121 for example support non-reversible transactions. The advantage of this arrangement is that the operating costs of the electronic currency system are greatly reduced by not having to resolve payment disputes. However, this way, it is also possible for electronic currency transactions to clear instantly, making the funds available immediately to the systems 10, 12. This means that using hard electronic currency is rather akin to a cash transaction. However, it is also conceivable to use soft electronic currency, such as currency that allows for the reversal of payments, for example having a "clearing time" of 72 hours, or the like. The electronic monetary parameter exchange method applies to all connected systems and modules related to the resource pooling systems 101, 121 of the present invention, such as the first and second payment transfer modules 103, 123. The monetary parameter transfer to the first and second resource pooling system 101, 121 can be initiated by the payment transfer module 103 and 123, respectively, or upon request by the related resource pooling system 101 or 121.

Further, the system 1 can comprise a core engine comprising the risk event triggers for triggering telematics measuring parameters in the data flow pathway, e.g. of an on-board control system, of the assigned risk exposed motor vehicle 41, ..., 45. The data flow pathway can for example be monitored by the system 1 by means of the mobile telematics device 401, ..., 405 that are connected to a data flow pathway via the interfaces 421, ..., 425; in particular, it can be monitored by the machine-learning based telematics circuit 11, thereby capturing component-related measuring parameters of the data flow pathway at least periodically and/or within predefined time periods. According to one alternative embodiment, the data flow pathway can for example also be dynamically monitored by the dynamically triggered by the system 1, such as by triggering telematics measuring parameters of the data flow pathway that are transmitted from the mobile telematics device 401, ..., 405 or associated measuring devices and/or systems. By triggering the data flow pathway, which comprises dynamically recorded telematics measuring parameters of the concerned risk exposed motor vehicles 41, ..., 45, the system 1 is able to detect the occurrence of the predefined risk events based on predefined trigger parameters. Furthermore, the system 1 can for example also dynamically monitor different stages during the progress of the impact of a risk event on the risk exposed motor vehicles 41, ..., 45 in order to provide appropriately adapted and gradated risk protection for a specific risk exposed motor vehicles 41, ..., 45. Such a risk protection structure is based on received and stored payments 1021, ..., 1025 from the related risk exposed motor vehicles 41, ..., 45 and/or related to the total risk exposure 5 of the risk-transfer system 10, based on the overall transferred risks of all pooled risk exposed motor vehicles 41, ..., 45.

To generate the dynamically adapted and/or optimized, in particular in real-time adaption, first and second risk transfer parameters and the correlated first and second payment transfer parameters 1021, ..., 1025/1221, ..., 1225 by means of the machine-learning based telematics circuit 11 based on the captured usage-based 31 and/or user-based 32 telematics data 3 from the mobile telematics devices 401, ..., 405 associated with the plurality of motor vehicles 41, ..., 45, the system 1 comprises a machine-learning based expert device, i.e. the machine-learning based telematics circuit 11. The machine-learning structure can be dynamically realized by a dynamically reacting realization of the telematics circuit 11. However, the machine-learning structure may also be fixed in the system 1, whereas the machine-learning operation is performed by external expert systems or the external expert knowledge, whereas the operation of the system 1 follows fixed data-processing steps. I.e. in this embodiment variant, the system 1 itself is not machine-learning based. Though, the present invention aims at a machine-learning based telematics system, the invention can also be applied to normal telematics circuits/systems (e.g. based on human-developed algorithms) as well.

The give an example for the location-depended determination of the risk of a motor vehicle 41, ..., 45, the system 1 can e.g. comprise an automated extended database 116 comprising location-depended data. By means of the database 116, the machine-learning based telematics circuit 11 is e.g. enabled to provide an automated location-dependent forecasting of absolute and relative risks e.g. for car accidents based on the captured telematics data 3, especially the captured usage-based 31 and/or user-based 32. By means of the machine-learning based telematics circuit 11, data records of accident events are generated and location-dependent probability values for specific accident conditions associated with the risk of car accident are determined. A spatial high-resolution grid 20 with grid cells 201, ..., 203 is generated over a geographical area 2 of interest by means of the machine-learning based telematics circuit 11, as illustrated by FIG. 1. The grid cells 201, ..., 203 can e.g. be associated with the cells of a cellular mobile network 2. The geographical area, e.g. covered by the cellular mobile network 2, includes at least a portion of motor vehicles 41, ..., 45 exposed to risks, e.g. accident risks. The grid cells 201, ..., 203 of the grid 20 are selectable and data are assignable via the telematics system 1 by means of the database 116 to each cell 201, ..., 203 of the grid 20, and data records representative of a grid cell are assigned to a year of occurrence or measurement and are saved in a memory module of the telematics circuit 11. The generation of the location and resolution of datasets is illustrated by the arrows from the database 116 to the grid cells 201, ..., 203 in FIG. 1. This figure show an exemplary data extraction and grid generation. The resolution can be adapted to dynamic triggered levels, e.g. cellular network grid cells 20 or municipality or district grids (e.g. 4*4, 10*10, 15*15 km grids). An appropriate quadtree can be generated by means of the telematics system 1 and associated with the processing steps by the system 1 from associated population density parameters. For each grid cell 201, ..., 203, an ambient population density parameter can be captured by means of the system 1 and assigned to a generated data record assigned to the corresponding grid cells 201, ..., 203. Population density parameters can be captured for the geographical area 2 of interest and customized weighting factors can be assigned in said spatial high-resolution grid 20 accounting for the diverse patterns. The population density parameter can for example be extracted by means of the system 1 from aerial high-resolution data, for instance comprising aerial images and/or aerophotos. In general, for the use of aerial high-resolution data of the present invention, the aerial high-resolution data can comprise aerial images and/or aerophotos measured by satellite and/or aircraft and/or aerostat or other measuring stations equipped with a balloon. The extraction of the population density parameters can be based on measured interaction between population density parameters and/or land use parameters and driving or traffic patterns. To perform the extraction using the system 1, the system 1 can comprise variables that measure the interaction of land use and travel behavior, i.e., traffic patterns. However, for the extraction, population density is the primary quantifiable land use descriptor variable. Population density parameters can be further used by the system 1 to isolate area types (urban, second city, suburban, town and rural). Other variables that can relate to quantifying land use, including residential density and work tract employment density parameters, can also be comprised by the system 1. Further parameters and characteristics of the population or built environment such as race, age, income, and retail employment can further be used to weight land use impacts across different population groups. For the extraction, greater population density can for example be associated with decreasing annual miles driven, greater bus availability, decreased dependency on single occupancy vehicles and increased use of transit. The private automobile is still the dominant mode of travel for most geographical areas 2, although African Americans, Asians and Hispanics are in general more likely to use other modes of transportation. Increasing population density is typically associated with fewer person trips, fewer person miles traveled, and fewer person miles per trip. Residents of densely populated areas report the fewest vehicle trips, vehicle miles traveled, and vehicle miles per trip. Less densely populated areas tend to have more drivers per adult and more vehicles per adult. For the determination of the customized weighting factors, the cities tend to follow national averages with regard to several transportation parameters, for example, drivers per adult, vehicles per adult, percentage of persons working from home, and auto-dependency. Approximately 20% of smaller city residents go to work by a mode other than private automobile. Residents of smaller cities report the highest number of person trips of any area type. Persons in suburban areas make the next highest number of person trips. Typically, a high number of low-income residents live in second cities, which have limited transit availability. For the extraction, the telematics system 1 can for example also identify locational preferences of specific segments of the population. High-income households generally tend to be located in suburban areas, while middle-income households are most often found in rural areas. Low-income households are generally found in urban or rural areas. Distance to work and travel time to work decrease as the percentage of retail trade in an area increases. Urban areas have the smallest percentage of residents working in census tracts with over 25% participation in retail trade. Smaller cities have the highest percentage with 28.8% of residents working, where more than 25% of jobs are in retail trade. Retail employment and employment density at the work census tract have some measurable correlations to travel behavior. At the home block group, increasing housing density is associated with greater transit availability and closer proximity to transit. Bicycle and walking trips increase as residential density increases. Increasing residential density is also associated with increasing employment density. At residential densities between 100 and 1.499 housing units per square mile, people are less likely to work at jobs with no fixed workplace. Low residential density areas have the largest percentage of people working at home. Thus, in summary, residential density parameters, retail employment, income, area type, and population density parameters all provide important descriptors or drivers for transportation behavior and policy implementation and are related to linking land use to transportation choices and behavior, wherein the data extraction by the system 1 for the ambient population density parameter and the customized weighting factors is based upon said measured variables. Note, that both the travel demand and supply characteristics of urban areas clearly differ from those of highways. Therefore, an analysis of highway traffic patterns and associated dynamics cannot be directly translated to the urban situation. One difference between urban traffic and highway traffic is that on the urban road network, multiple traffic modes coexist and interact, for instance pedestrians, bicycles, cars, buses, trucks, whereas highways are mainly used by cars and trucks.

The above example shows the machine-learning structure based on the location-specific traffic behavior. Analogously, the other captured telematics data 3 are processed by the machine-learning based telematics circuit 11 providing their appropriately weighted risk-contribution. For each of the various risk contributions, the database 115 comprise historical data allowing to extract and generate the weighted risk contributions.

Finally, it is important to note that the present invention relates to a telematics based risk-transfer system 1 with mobile telematics devices 401, . . . , 405 associated with a plurality of motor vehicles 41, . . . , 45. However, the invention can be applied to a telematics based risk-transfer system 1 for connected motor vehicles, as e.g. cars, connected homes, connected factories, connected offices, and/or connected health/life by means of telematics devices 41, . . . , 45.

LIST OF REFERENCE SIGNS

1 Machine-learning based telematics system
  10 First risk-transfer system
    101 Automated resource pooling system
    102 First data store
      1021, . . . 1025 First payment parameters
    103 First payment transfer modules
  11 Machine-learning based telematics circuit
    111 Scores driver module
      1111, . . . , 1113 Scores driver parameters
      1121, . . . , 1123 Defined scores driver behavior pattern
    112 Additional trigger triggering accident notification
    113 Additional trigger triggering added services
    114 Aggregation module
      1141 Predefined time period
    115 Database with historical data
    116 Automated database with location-depended data
  12 Second risk-transfer system
    121 Automated resource pooling system
    122 Second data store
      1221, . . . , 1225 Second payment parameters
    123 Second payment transfer modules
      1231 Control device
      1232 Activation control parameter
    124 Activation threshold parameter
    125 Predefined loss covering portion
2 Data transmission network
  20 Cellular network grid
    201, . . . , 203 Network cell/Basic service area
    211, . . . , 213 Base (transceiver) station
      2111, . . . , 2131 Cell Global Identity (CGI)
    221, . . . , 225 Mobile network nodes
  21 Uni- or bidirectional data link
3 Telematics data
  31 Usage-based telematics data
    311, . . . , 313 Usage-based telematics data of the vehicles 41, . . . , 45
  32 User-based telematics data
    321, . . . , 323 User-based telematics data of the vehicles 41, . . . , 45
41, . . . , 45 Motor vehicles
  401, . . . , 405 Mobile telematics device
    4011 Sensors
    4012 Measuring devices
    4013 Speakers
    4014 Microphones
    4015 Device alerts drivers
  411, . . . , 415 Wireless connections
    4111 Radio data systems (RDS) modules
    4112 Positioning system modules
    4113 Mobile cellular telephone
    4114 Language unit
    4115 Satellite receiving module
    4116 Global Positioning System (GPS) module
  421, . . . , 425 Data transmission bus interface
  431, . . . , 435 On-board diagnostic system
  441, . . . , 445 In-car interactive device
  451, . . . , 455 Cellular mobile node application
  42 Second payment transfer module
5 Aggregated risk exposure
  Transferred risk exposures of the motor vehicles
  First risk transfer parameters
  Second risk transfer parameters
  Predefined risk events
    611, . . . , 613 Parameters measuring the occurrence of predefined event 1
    621, . . . , 623 Parameters measuring the occurrence of predefined event 2
    631, . . . , 633 Parameters measuring the occurrence of predefined event 3
  71, . . . 75 Occurred loss associated with the motor vehicles 41, . . . , 45
  Captured loss parameters of measured predefined event 1
  Captured loss parameters of measured predefined event 2
  Captured loss parameters of measured predefined event 3
  Aggregated loss parameter
  Aggregated payment parameter
  Variable loss ratio parameter
  Loss ratio threshold value

The invention claimed is:

1. A telematics system with mobile telematics devices associated with a plurality of motor vehicles, the mobile telematics devices comprising one or more wireless connections, and a plurality of interfaces to connect with sensors and/or measuring devices, wherein, to provide a wireless connection, at least one of the mobile telematics devices acts as a wireless node within a corresponding data transmission network by way of antenna connections of the at least one of the mobile telematics devices, and wherein the at least one of the mobile telematics devices is connected to an on-board diagnostic system (OBD) or a monitoring cellular mobile node application, and wherein the at least one of the mobile telematics devices captures usage-based and user-based telematics data of a motor vehicle of the motor vehicles and a user, the telematics system comprising:

a machine-learning based telematics circuit to which the mobile telematics devices associated with the motor vehicles are connected, a data link being set by way of the wireless connection between the machine-learning based telematics circuit transmitting at least the captured usage-based and user-based telematics data from the mobile telematics devices to the machine-learning based telematics circuit;

a first risk-transfer system comprising at least one processor and a plurality of first payment transfer modules, the first risk-transfer system configured to provide a first risk-transfer based on first risk-transfer parameters transferring the risk-exposure from at least some of the motor vehicles to the first risk-transfer system, the first payment transfer modules configured to receive and store first payment parameters associated with risk-transfer of risk exposures of the motor vehicles for pooling of their risks, wherein the machine-learning based telematics circuit is configured to trigger and automatically select scores driver parameters based on defined scores driver behavior pattern by comparing the captured usage-based and user-based telematics data from the mobile telematics devices with the defined scores driver behavior pattern, wherein a driver's profile and pattern is compared to other driver's profiles or pattern at a same location and/or comparable conditions, the machine-learning based telematics circuit is configured to process risk-related telematics data captured from the mobile telematics devices, to generate and to transmit the first risk-transfer parameters and correlated first payment transfer parameters to the first risk-transfer system, and, in response to triggering occurrence of one of predefined risk events associated with transferred risk exposure of the motor vehicles, occurred loss being automatically covered by the first risk-transfer system based on the first risk-transfer parameters and correlated first payment transfer parameters; and a second risk-transfer system comprising at least one processor and a plurality of second payment transfer modules, the second risk-transfer system configured to provide a second risk-transfer based on second risk-transfer parameters transferring a portion of the risk exposures accumulated by the first risk-transfer system from the first risk-transfer system to the second risk-transfer system, the second payment transfer modules configured to receive and store second payment parameters for pooling of the risks of the first risk-transfer system associated with risk exposures transferred to the first risk-transfer system, wherein the machine-learning based telematics circuit is configured to generate and transmit the second risk-transfer parameters and correlated second payment transfer parameters to the second risk-transfer system, the occurred loss being at least partly covered by the second risk-transfer system based on the second risk-transfer parameters and the correlated second payment transfer parameters, the machine-learning based telematics circuit is configured to dynamically adapt and/or optimize the first and second risk-transfer parameters and the correlated first and second payment transfer parameters based on the captured usage-based and/or user-based telematics data from the mobile telematics devices associated with the motor vehicles and based on the pooled risks of the first risk-transfer system, the machine-learning based telematics circuit is configured to automatically steer, trigger, signal, and mutually activate the first and second risk-transfer systems based on the dynamically adaptable and/or optimizable first and second risk-transfer parameters and the correlated first and second payment transfer parameters, providing a self-sufficient risk protection for a variable number of the motor vehicles associated with the mobile telematics devices by the first and second risk-transfer systems, in response to triggering exceedance of a defined activation threshold parameter, the second risk-transfer system is automatically activated by transferring activation signaling by the machine-learning based telematics circuit to the second risk-transfer system covering, upon activation, an adopted portion of the risk exposures accumulated by the first risk-transfer system, and the machine-learning based telematics circuit, the first risk-transfer system, and the second risk-transfer system are in communication with each other.

2. The telematics system according to claim 1, wherein the machine-learning based telematics circuit is configured to automatically capture scores risks according to a measured location or trip of the motor vehicle based on the captured usage-based and user-based telematics data from the mobile telematics devices associated with the motor vehicles.

3. The telematics system according to claim 1, wherein the machine-learning based telematics circuit is configured to trigger accident notification and/or other added services based on the captured usage-based and user-based telematics data from the mobile telematics devices associated with the motor vehicles.

4. The telematics system according to claim 1, wherein the mobile telematics devices provide the one or more wireless connections by radio data systems (RDS) modules and/or a positioning system including a satellite receiving module and/or a mobile telephone including a digital radio service module and/or a language unit in communication with the RDS modules and/or the positioning system or a cellular telephone module.

5. The telematics system according to claim 4, wherein the satellite receiving module comprises a Global Positioning System (GPS) circuit and/or the digital radio service module comprises at least a Global System for Mobile Communications (GSM) unit.

6. The telematics system according to claim 1, wherein the mobile telematics devices comprise a plurality of interfaces for connection with at least one data transmission bus of the motor vehicle comprises at least an interface for connection with the motor vehicle's Controller Area Network (CAN) bus.

7. The telematics system according to claim 1, wherein the machine-learning based telematics circuit comprises an aggregation module providing the risk exposure for one or more of the motor vehicles based on the captured risk-related telematics data, wherein the first and second risk-transfer parameters and the correlated first and second payment transfer parameters are dynamically generated based on a likelihood of the occurrence of the predefined risk events of the motor vehicles.

8. The telematics system according to claim 1, wherein the occurred and triggered losses are automatically aggregated by captured loss parameters of the measured occurrence of risk events over all the motor vehicles within a predefined time period by incrementing an associated stored aggregated loss parameter and automatically aggregating the received and stored first payment parameters over all the motor vehicles within the predefined time period by incrementing an associated stored, aggregated payment parameter, and wherein the first and second risk-transfer parameters and the correlated first and second payment transfer parameters are dynamically generated based upon a ratio of the aggregated loss parameter and the aggregated payment parameter.

9. The telematics system according to claim 1, wherein the first risk-transfer system comprises an automated first resource pooling system and the second risk-transfer system comprises an automated second resource pooling system,
wherein the motor vehicles are connected to the first resource pooling system by a plurality of payment transfer modules configured to receive and store first payments from the motor vehicles for the pooling of their risk exposures,
wherein the first risk-transfer system provides automated risk protection for each of the motor vehicles based on received and stored first payment parameters,
wherein the first risk-transfer system is connected to the second resource pooling system by second payment transfer modules configured to receive and store second payment parameters from the first insurance system to adopt a portion of the risk exposures accumulated by the first risk-transfer system, and
wherein, in response to the occurrence of one of predefined risk events, the occurred loss is automatically covered by the machine-learning based telematics circuit.

10. The telematics system according to claim 1, wherein at least some of the mobile telematics devices comprise a memory to store processor-driving operation code.

11. The telematics system according to claim 1, further comprising:
the sensors configured to capture at least some of the usage-based and user-based telematics data, the sensors comprising at least an accelerometer to measure g-force of the motor vehicle during acceleration, braking, and cornering, and/or a global positioning system (GPS) to record location data and to calculate driving distances.

12. The telematics system according to claim 1, wherein at least some of the mobile telematics devices each comprise a cellular modem to transmit the usage-based and user-based telematics data from the mobile telematics device to the machine-learning based telematics circuit.

13. The telematics system according to claim 1, wherein at least some of the mobile telematics devices are each connected to a respective OBD system, which monitors systems and/or subsystems of the motor vehicles.

14. The telematics system according to claim 13, wherein the at least some of the mobile telematics devices, each connected to the respective OBD system of the respective motor vehicle of the motor vehicles, are each connected via a data transmission wire plugged into a port of the respective OBD system.

15. The telematics system according to claim 1, wherein at least some of the mobile telematics devices are each connected to a respective in-car interactive device, wherein speed and travel distances of the motor vehicle is monitored by a global positioning system (GPS) circuit and the telematics data are transmitted from the mobile telematics device to the machine-learning based telematics circuit via a cellular telecommunication connection.

16. The telematics system according to claim 1, wherein at least some of the mobile telematics devices each comprise speakers and a voice connection from the machine-learning based telematics circuit and/or the first and/or second risk-transfer system to the mobile telematics device thereby providing real-time coaching-services to the user of the motor vehicle on driving skills and/or other usage-based or user-based behaviors.

17. The telematics system according to claim 1, wherein at least some of the mobile telematics devices are each connected to a mobile phone application, and comprises a global positioning system (GPS) circuit and/or a mobile network triangulation device providing monitoring of travel speed, frequency of travel, location, and driving style, and
wherein the machine-learning based telematics circuit is configured to receive the captured usage-based and user-based telematics data via a network connection of each of the mobile telematics devices.

18. The telematics system according to claim 1, wherein, in response to triggering the occurrence of a loss based upon captured loss parameters of measured predefined risk event, the second risk-transfer system is automatically activated by transferring the activation signaling by the machine-learning based telematics circuit to the second risk-transfer system covering, upon activation, a predefined portion of the occurred loss at the first risk-transfer system.

19. The telematics system according to claim 1, further comprising:
an aggregation circuit configured to automatically aggregate captured loss parameters of measured occurrence of risk events over all the motor vehicles, increment an associated stored aggregated loss parameter within a predefined time period, and automatically aggregate the received and stored first payment parameters over all the risk exposure components within the predefined time period by incrementing an associated stored, aggregated payment parameter, wherein a variable loss ratio parameter dynamically is generated based upon the ratio of the aggregated loss parameter and the aggregated payment parameter, and wherein the first and second risk-transfer parameters and the correlated first and second payment transfer parameters are dynamically generated based on likelihood of the occurrence of the predefined risk events of the motor vehicles and the variable loss ratio parameter.

20. The telematics system according to claim 19, wherein, by triggering the variable loss ratio parameter exceeding a loss ratio threshold value, the first and second risk-transfer parameters and the correlated first and second payment transfer parameters are dynamically adapted based on the likelihood of the occurrence of the predefined risk events of the motor vehicles and the variable loss ratio parameter.

21. The telematics system according to claim 1, wherein the triggering the exceedance of the defined the activation threshold parameter is associated with triggered value of an accumulated occurrence of measured risk events.

22. The telematics system according to claim 1, wherein the motor vehicles are connected to the first risk-transfer system transferring risk exposure associated with the occurrence of predefined risk events from the motor vehicles to the first risk-transfer system by dynamically adapted and optimized first risk-transfer parameters and correlated dynamically aligned first payment transfer parameters,
wherein the first risk-transfer system is connected to the second risk-transfer system by transferring risk exposure associated with the occurrence of the predefined risk events from the first risk-transfer system to the second risk-transfer system by dynamically adapted and optimized second risk-transfer parameters and correlated dynamically aligned second payment transfer parameters, wherein, in response to the occurrence of one of the predefined risk events, loss parameters measuring the loss at the motor vehicles are captured and transmitted to the first risk-transfer system, and wherein the occurred loss is automatically covered by the first risk-transfer system based on the optimized first risk-transfer parameters.

23. The telematics system according to claim 22, wherein, in response to the occurrence of one of predefined risk events, loss parameters measuring the loss at the motor vehicles are automatically captured and transmitted to the first risk-transfer system, and wherein the occurred loss is automatically covered by the first risk-transfer system.

24. The telematics system according to claim 1, further comprising a control device configured to capture a payment transfer from the first risk-transfer system to the second payment transfer module, wherein the second risk-transfer system is only activatable by triggering a payment transfer matching a predefined activation control parameter.

25. The telematics system according to claim 1, wherein an occurred loss associated with a predefined risk event and allocated to the motor vehicle is distinctly covered by an automated first resource pooling system of the first risk-transfer system via a transfer of payments from the automated first resource pooling system to the motor vehicle, and wherein a second payment transfer from an automated second resource pooling system of the second risk-transfer system to the automated first resource pooling system is triggered via a generated activation signal based on the measured actual loss of the motor vehicle by the telematics system.

26. The telematics system according to claim 25, wherein the occurred loss corresponding to the risk transferred to the second risk-transfer system is directly covered by the automated second resource pooling system through the transfer of resources from the automated second resource pooling system to the motor vehicles via the second payment transfer module.

27. The telematics system according to claim 1, wherein the machine-learning based telematics circuit is configured to process risk-related telematics data and provide likelihood of the occurrence of the predefined risk events of the motor vehicles based on the risk-related telematics data, and wherein receipt and preconditioned storage of payments from the motor vehicles for the pooling of their risks is dynamically determined based on total risk and/or likelihood of the occurrence of the predefined risk events of the motor vehicles.

28. The telematics system according to claim 1, wherein the machine-learning based telematics circuit is configured to process risk-related telematics data and generate likelihood of the occurrence of the predefined risk events of the motor vehicles based on the risk-related telematics data, and wherein receipt and preconditioned storage of payments from a first resource pooling system to a second resource pooling system for transfer of its risk is dynamically determined based on total risk and/or likelihood of the occurrence of the predefined risk events of the motor vehicles.

29. The telematics system according to claim 1, wherein the machine-learning based telematics circuit is configured to dynamically adapt a number of motor vehicles to a range where non-covariant occurring risks covered by the first risk-transfer system affect only a proportion of the motor vehicles at any given time.

30. The telematics system according to claim 1, wherein the machine-learning based telematics circuit is configured to dynamically adapt the risk transfer from the first risk-transfer system via the second risk-transfer system to a range where non-covariant occurring risks covered by the second risk-transfer system affect only a proportion of the total risk transferred from the first risk-transfer system at any given time.

31. The telematics system according to claim 1, wherein the machine-learning based telematics circuit is configured to dynamically adapt the first and second risk-transfer parameters and the correlated first and second payment transfer parameters based on time-correlated incidence data for one or a plurality of risk events.

32. The telematics system according to claim 1, wherein, upon each triggering of an occurrence of captured telematics data or parameters indicating a risk event by the machine-learning based telematics circuit, a total parametric payment is allocated with the triggering, wherein the total allocated payment is transferrable when the occurrence has been triggered to a motor vehicle of the motor vehicles affected by the measured occurrence of the risk event.

33. The telematics system according to claim 1, wherein, in response to triggering exceedance of a defined activation threshold parameter associated with the occurrence of defined risk events or as a predefined portion of an occurred loss, the occurred loss is at least partly covered by the second risk-transfer system based on the second risk-transfer parameters and the correlated second payment transfer parameters.

34. The telematics system according to claim 1, wherein the telematics system with mobile telematics devices is a machine-learning based telematics system.

35. A telematics method for a telematics system with mobile telematics devices associated with a plurality of motor vehicles, the mobile telematics devices comprising one or more wireless connections, and a plurality of interfaces to connect with sensors and/or measuring devices, wherein, to provide a wireless connection, at least one of the mobile telematics devices acts as a wireless node within a corresponding data transmission network by way of antenna connections of the at least one of the mobile telematics devices, and wherein the at least one of the mobile telematics devices is connected to an on-board diagnostic system (OBD) or a monitoring cellular mobile node application, and wherein the at least one of the mobile telematics devices capture usage-based and user-based telematics data of a motor vehicle of the motor vehicles and a user, the telematics method comprising:

transmitting, via the wireless connection, at least the captured usage-based and/or user-based telematics data from the mobile telematics devices to a machine-learning based telematics circuit, to which the mobile telematics devices associated with the motor vehicles are connected;

providing, by a first risk-transfer system that comprises at least one processor, a first risk-transfer based on first risk-transfer parameters transferring the risk-exposure from at least some of the motor vehicles to the first risk-transfer system, and receiving and storing, by the first risk-transfer system, first payment parameters associated with risk-transfer of risk exposures of the motor vehicles for pooling of their risks;

triggering and automatically selecting, by the machine-learning based telematics circuit, scores driver parameters based on defined scores driver behavior pattern by comparing the captured usage-based and user-based telematics data from the mobile telematics devices with the defined scores driver behavior pattern, wherein a driver's profile and pattern is compared to other driver's profiles or pattern at a same location and/or comparable conditions;

processing, by the machine-learning based telematics circuit, risk-related telematics data captured from the mobile telematics devices, generating and transmitting, by the machine-learning based telematics circuit, the first risk-transfer parameters and correlated first payment transfer parameters to the first risk-transfer system, and, in response to triggering occurrence of one of predefined risk events associated with transferred risk exposure of the motor vehicles, occurred loss being automatically covered by the first risk-transfer system based on the first risk-transfer parameters and correlated first payment transfer parameters;

providing, by a second risk-transfer system that comprises at least one processor, a second risk-transfer based on second risk-transfer parameters transferring a portion of the risk exposures accumulated by the first risk-transfer system from the first risk-transfer system to the second risk-transfer system, and receiving and storing, by the second risk-transfer system, second payment parameters for pooling of the risks of the first risk-transfer system associated with risk exposures transferred to the first risk-transfer system;

generating and transmitting, by the machine-learning based telematics circuit, the second risk-transfer parameters and correlated second payment transfer parameters to the second risk-transfer system, the occurred loss being at least partly covered by the second risk-transfer system based on the second risk-transfer parameters and the correlated second payment transfer parameters;

dynamically adapting and/or optimizing, by the machine-learning based telematics circuit, the first and second risk-transfer parameters and the correlated first and second payment transfer parameters based on the captured usage-based and/or user-based telematics data from the mobile telematics devices associated with the plurality of motor vehicles and based on the pooled risks of the first risk-transfer system;

automatically steering, triggering, signaling, and mutually activating, by the machine-learning based telematics circuit, the first and second risk-transfer systems based on the dynamically adaptable and/or optimizable first and second risk-transfer parameters and the correlated first and second payment transfer parameters, providing a self-sufficient risk protection for a variable number of motor vehicles associated with the mobile telematics devices by the first and second risk-transfer systems; and in response to triggering exceedance of a defined activation threshold parameter, automatically activating the second risk-transfer system by transferring activation signaling by the machine-learning based telematics circuit to the second risk-transfer system covering, upon activation, an adopted portion of the risk exposures accumulated by the first risk-transfer system, the machine-learning based telematics circuit, the first risk-transfer system, and the second risk-transfer system being in communication with each other.

* * * * *